United States Patent
Iio et al.

(10) Patent No.: US 11,367,266 B2
(45) Date of Patent: Jun. 21, 2022

(54) IMAGE RECOGNITION SYSTEM, IMAGE RECOGNITION METHOD, AND STORAGE MEDIUM

(71) Applicant: NEC CORPORATION, Tokyo (JP)

(72) Inventors: Ryoma Iio, Tokyo (JP); Kota Iwamoto, Tokyo (JP); Hideo Yokoi, Tokyo (JP); Ryo Takata, Tokyo (JP); Kazuya Koyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 122 days.

(21) Appl. No.: 16/485,680

(22) PCT Filed: Feb. 8, 2018

(86) PCT No.: PCT/JP2018/004422
§ 371 (c)(1),
(2) Date: Aug. 13, 2019

(87) PCT Pub. No.: WO2018/151008
PCT Pub. Date: Aug. 23, 2018

(65) Prior Publication Data
US 2020/0012878 A1 Jan. 9, 2020

(30) Foreign Application Priority Data

Feb. 14, 2017 (JP) ............................. JP2017-024890
Feb. 14, 2017 (JP) ............................. JP2017-024891
Feb. 14, 2017 (JP) ............................. JP2017-024892

(51) Int. Cl.
*G06V 10/24* (2022.01)
*G07G 1/00* (2006.01)
(Continued)

(52) U.S. Cl.
CPC .......... *G06V 10/242* (2022.01); *G06V 10/751* (2022.01); *G06V 20/00* (2022.01); *G07G 1/00* (2013.01)

(58) Field of Classification Search
CPC ........................... G06K 9/3208; G06K 9/3233
See application file for complete search history.

(56) References Cited

U.S. PATENT DOCUMENTS 7,116,799 B2 * 10/2006 Wustefeld ............ G06K 9/2036
382/103
9,330,474 B1 5/2016 Shekar et al.
(Continued)

FOREIGN PATENT DOCUMENTS

CN 102077117 A 5/2011
CN 202111802 U 1/2012
(Continued)

OTHER PUBLICATIONS

Notice of Reasons for Refusal dated Dec. 8, 2020 from the Japanese Patent Office in JP Application No. 2017-024891.
(Continued)

*Primary Examiner* — Oneal R Mistry
*Assistant Examiner* — Nicolas James Boyajian
(74) *Attorney, Agent, or Firm* — Sughrue Mion, PLLC

(57) ABSTRACT

Provided is an image recognition system that can easily perform image recognition on a side face of an item. An image recognition system according to one example embodiment of the present invention includes: a placement stage used for placing an item below an image capture device provided so as to perform capturing of a downward direction; a support structure configured to support the item at a predetermined angle relative to a top face of the placement stage; and an image recognition apparatus that
(Continued)

identifies the item by performing image recognition on an image of the item acquired by the image capture device.

27 Claims, 26 Drawing Sheets

(51) Int. Cl.
*G06V 10/75* (2022.01)
*G06V 20/00* (2022.01)

(56) References Cited

U.S. PATENT DOCUMENTS

| | | | |
|---|---|---|---|
| 10,319,094 B1* | 6/2019 | Chen | G06F 3/0484 |
| 2003/0103650 A1 | 6/2003 | Otsuka et al. | |
| 2005/0058367 A1* | 3/2005 | Fujimoto | G06T 5/006 |
| | | | 382/276 |
| 2007/0104358 A1* | 5/2007 | Komatsu | G06K 9/6203 |
| | | | 382/151 |
| 2013/0016885 A1* | 1/2013 | Tsujimoto | G06T 5/003 |
| | | | 382/128 |
| 2013/0058530 A1 | 3/2013 | Naito et al. | |
| 2014/0052555 A1* | 2/2014 | MacIntosh | G06K 9/00664 |
| | | | 705/23 |
| 2015/0264270 A1* | 9/2015 | Watanabe | G02B 21/24 |
| | | | 348/79 |
| 2016/0037088 A1* | 2/2016 | Kakino | H04N 5/23238 |
| | | | 348/164 |
| 2016/0125252 A1* | 5/2016 | Harada | G06K 9/50 |
| | | | 382/103 |
| 2016/0131593 A1* | 5/2016 | Kwon | H01L 27/3244 |
| | | | 438/7 |
| 2016/0275363 A1* | 9/2016 | Matsuzaki | G06Q 20/208 |
| 2017/0011378 A1 | 1/2017 | Inoue et al. | |

FOREIGN PATENT DOCUMENTS

| | | |
|---|---|---|
| CN | 102495026 A | 6/2012 |
| CN | 104138846 A | 11/2014 |
| CN | 104584070 A | 4/2015 |
| CN | 20488385 U | 12/2015 |
| CN | 204946113 U | 1/2016 |
| CN | 106204622 A | 12/2016 |
| CN | 106255863 A | 12/2016 |
| JP | 2013-54673 A | 3/2013 |
| JP | 2013-156933 A | 8/2013 |
| JP | 2013-250768 A | 12/2013 |
| JP | 2014-49015 A | 3/2014 |
| JP | 2014-052805 A | 3/2014 |
| JP | 2014-531636 A | 11/2014 |
| JP | 2015-130097 A | 7/2015 |
| JP | 2015-138349 A | 7/2015 |
| JP | 2015-194791 A | 11/2015 |
| JP | 2017-220198 A | 12/2017 |
| WO | 2015-033577 A1 | 3/2015 |
| WO | 2015/140855 A1 | 9/2015 |
| WO | 2014/087621 A1 | 1/2017 |

OTHER PUBLICATIONS

Notice of Reasons for Refusal dated Dec. 24, 2020 from the Japanese Patent Office in JP Application No. 2017-024892.
Chinese Office Action for CN Application No. 201880011459.8 dated Jan. 29, 2021 with English Translation.
International Search Report for PCT/JP2018/004422 dated May 1, 2018 [PCT/ISA/210].
Japanese Office Action far JP Applicatian No. 2021-062498 dated Apr. 28, 2022 with English Translalion.

* cited by examiner

IMAGE RECOGNITION SYSTEM, IMAGE RECOGNITION METHOD, AND STORAGE MEDIUM

CROSS REFERENCE TO RELATED APPLICATIONS

This application is a National Stage of International Application No. PCT/JP2018/004422, filed on Feb. 8, 2018, which claims priority from Japanese Patent Application No. 2017-024890, filed on Feb. 14, 2017, Japanese Patent Application No. 2017-024891, filed on Feb. 14, 2017, and Japanese Patent Application No. 2017-024892, filed on Feb. 14, 2017, the contents of all of which are incorporated herein by reference in their entirety.

TECHNICAL FIELD

The present invention relates to an image recognition system, an image recognition method, and a storage medium.

BACKGROUND ART

Conventionally, it has been a common practice that, when a customer purchases an item at a retail shop or the like, a POS terminal identifies the item by reading a barcode attached to the item and acquires item information such as a name, a price, or the like. In recent years, a technology that does not require for an item to be attached with a barcode and identifies an item based on an external feature of the item by using an image recognition technology has been developed.

Patent Literature 1 discloses a technology that captures a plurality of items arranged in a predetermined recognition region from multiple directions and collectively recognizes the plurality of items from a feature amount of the captured image. In the technology disclosed in Patent Literature 1, capturing from multiple directions is performed by using a plurality of image capture devices or changing the position of a single image capture device. Thereby, it is possible to identify a plurality of items at the same time and acquire item information efficiently.

CITATION LIST

Patent Literature

PTL 1: Japanese Patent Application Laid-Open No. 2013-54673

SUMMARY OF INVENTION

Technical Problem

Since an item has a three-dimensional shape in general, in the image recognition technology, an item is identified by using an external feature in an image captured for at least one face of the item. For example, when a single image capture device fixed above an item is used, while the top face of an item arranged on a stage is captured naturally, it is necessary to lay the item sidelong in order to capture the side face of the item. However, it is not preferable for some items to be laid for a hygienic reason, such as a beverage can whose portion of an easy open end that will touch the mouth of a customer is exposed. Further, some items such as a soft unbaked cake should not be laid or may be damaged by being laid.

When an item is captured from multiple directions as disclosed in the technology disclosed in Patent Literature 1, while it is possible to easily capture not only the top face but also the side face of the item, large cost is needed for providing a plurality of image capture devices or configuring the image capture device to be movable, and processing becomes complex because of a need for aggregating multiple pieces of image information.

The present invention has been made in view of the problems described above, and an example object is to provide an image recognition system that can easily perform image recognition of the side face of an item.

Further, even with a process of image recognition, it may be difficult to distinguish items such as beverage cans that include a common logo and are sold in various sizes. Further, for some items having various shapes or colors, such as fresh food, it may be difficult to apply a process of image recognition that uses a shape or a color. Thus, by performing different processes in accordance with a type or a state of items, it appears to be possible to improve accuracy of image recognition. In the technology disclosed in Patent Literature 1, however, since a plurality of items arranged in a recognition region are handled in the same way, it is not possible to apply different recognition processes depending on the items.

The present invention has been made in view of the problems described above, and another example object is to provide an image recognition system, an image recognition method, and a storage medium that can apply different recognition processes to a plurality of items targeted for image recognition, respectively.

Furthermore, because of external appearance similar to each other, it may be difficult to distinguish items such as beverage cans that include a common logo and are sold in various sizes by using a process of image recognition that simply uses external appearance (feature amount) of items as disclosed in the technology disclosed in Patent Literature 1.

The present invention has been made in view of the problems described above, and yet another example object is to provide an image recognition system, an image recognition method, and a storage medium that can easily identify similar items having different sizes in an image recognition process.

Solution to Problem

A first example aspect of the present invention is an image recognition system including: a placement stage used for placing an item below an image capture device provided so as to perform capturing of a downward direction; a support structure configured to support the item at a predetermined angle relative to a top face of the placement stage; and an image recognition apparatus that identifies the item by performing image recognition on an image of the item acquired by the image capture device.

A second example aspect of the present invention is an image recognition method including steps of: acquiring an image of an item arranged in a recognition region; and identifying the item based on external appearance of the item and a position of the item in the recognition region in the acquired image.

A third example aspect of the present invention is a storage medium storing a program that causes a computer to perform steps of: acquiring an image of an item arranged in a recognition region; and identifying the item based on external appearance of the item and a position of the item in the recognition region in the acquired image.

A fourth example aspect of the present invention is an image recognition method including steps of: acquiring an image of an item arranged such that a predetermined face is located on a reference coordinate; extracting an item corresponding to the item in the acquired image based on external appearance of the item in the acquired image; superimposing an outer edge of the extracted item on the item in the acquired image; calculating a difference between the outer edge and the reference coordinate; and determining the item in the acquired image based on the difference.

A fifth example aspect of the present invention is a storage medium storing a program that causes a computer to perform steps of: acquiring an image of an item arranged such that a predetermined face is located on a reference coordinate; extracting an item corresponding to the item in the acquired image based on external appearance of the item in the acquired image; superimposing an outer edge of the extracted item on the item in the acquired image; calculating a difference between the outer edge and the reference coordinate; and determining the item in the acquired image based on the difference.

Advantageous Effects of Invention

According to the present invention, since an image of an item supported by the support structure is captured, image recognition can be easily performed on the side face of the item.

Further, according to the present invention, different processes of image recognition can be performed on a plurality of items arranged in a recognition region based on the positions of items, respectively.

Furthermore, according to the present invention, by using a reference coordinate at which an item is arranged, it is possible to easily identify similar items having different sizes in image recognition.

DESCRIPTION OF EMBODIMENTS

While example embodiments of the present invention will be described below with reference to the drawings, the present invention is not limited to these example embodiments. Note that, throughout the diagrams described below, those having the same function are labeled with the same reference, and the duplicated description thereof may be omitted.

First Example Embodiment

Figure 1:
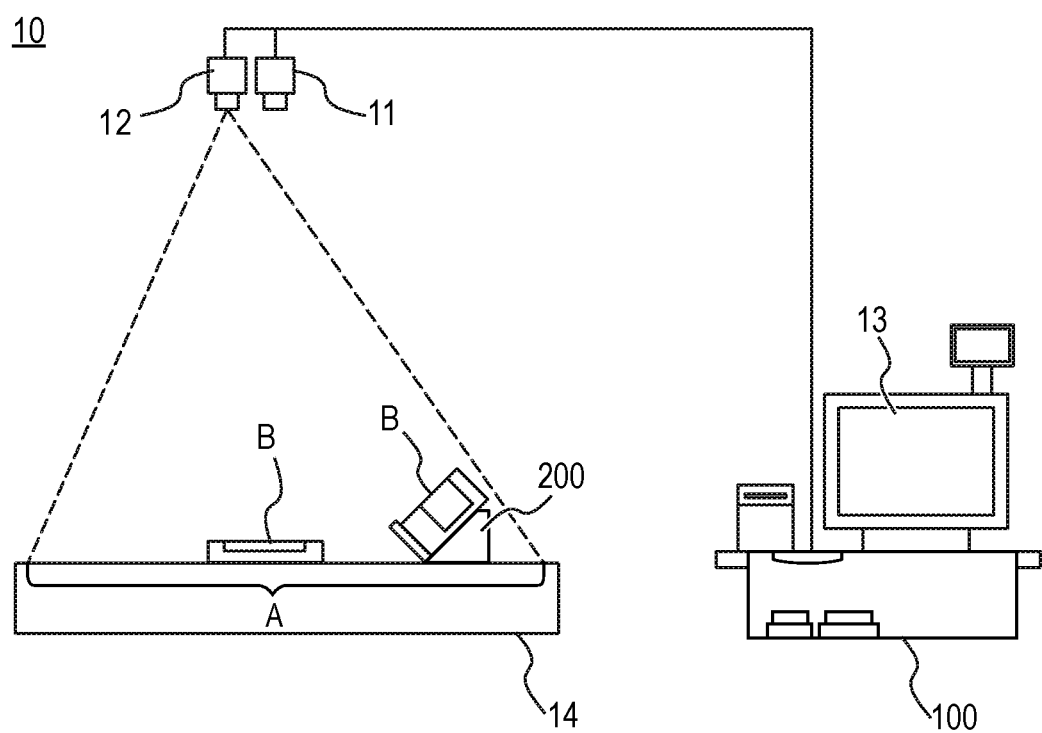
FIG. 1 is a schematic diagram of an image recognition system according to a first example embodiment.

FIG. 1 is a schematic diagram of an image recognition system 10 according to the present example embodiment.

The image recognition system 10 has a POS terminal (point of sales information management terminal) 100 as an image recognition apparatus, a placement stage 14 used for placing items targeted for image recognition thereon, and a support portion 200 used for supporting items on the placement stage 14. The POS terminal 100 is connected to an image capture device 11 provided at a position where items on the placement stage 14 can be captured, a projection device that can project a predetermined image on the placement stage 14, and a display device 13 that displays information regarding items. While being formed integrally with the POS terminal 100 in the present example embodiment, the image recognition apparatus may be provided separately from the POS terminal 100 and configured to exchange necessary information with the POS terminal 100 to implement an image recognition method according to the present example embodiment.

The POS terminal 100 displays item information under payment, a payment amount, a predetermined message, or the like on the display device 13. The item information is acquired by an image recognition method described later. Further, the POS terminal 100 may perform any process related to payment such as deposit and withdrawal of money, printing of a receipt, or the like.

The placement stage 14 has a placement face (top face) extending in the horizontal direction (that is, a direction perpendicular to the gravity direction). One or more items B are placed on the placement face of the placement stage 14.

The image capture device 11 is provided above the placement stage 14 in the gravity direction and fixed to a pillar, an arm, a ceiling, or the like (not illustrated). The image capture device 11 is any image capture device such as a camera or a scanner that acquires an image by using an image sensor such as a Charge Coupled Device (CCD) sensor, a Complementary Metal Oxide Semiconductor (CMOS) sensor, or the like, for example. The image capture device 11 can capture a region including at least the placement face of the placement stage 14 and transmits a signal indicating a captured image to the POS terminal 100. The signal indicating an image captured by the image capture device 11 may be directly transmitted to the POS terminal 100 or may be once stored in a storage device and then read by the POS terminal 100. To capture items on the placement stage 14 evenly, it is desirable that the optical axis of the image capture device 11 match the normal line of the placement face of the placement stage 14. The image capture device 11 may perform capturing at predetermined time intervals or may perform capturing in accordance with an instruction from the POS terminal 100.

The projection device 12 is provided above the placement stage 14 in the gravity direction and fixed to a pillar, an arm, a ceiling, or the like (not illustrated). The projection device 12 is any projection device such as a projector that projects a desired image by using a light source such as a lamp, a light emitting diode (LED), or the like. The projection device 12 projects an image on the placement face of the placement stage 14 in accordance with a signal from the POS terminal 100. The projection device 12 is installed at a predetermined position from which such projection can be realized. The installation position of the projection device 12 is a design matter. For example, the projection device 12 may be installed right above or diagonally above the placement face to project an image from such a direction. In addition, the projection device 12 may be installed on the placement face to project an image from a lateral direction. In addition, the placement stage 14 may be formed of a transparent member, and the projection device 12 may be installed under the placement stage 14. In such a case, the projection device 12 projects an image on the placement face of the placement stage 14 from the underside of the placement stage 14.

In the present example embodiment, the projection device 12 projects, on the placement face of the placement stage 14, an image which indicates a recognition region A (for example, a frame surrounding the recognition region A) that is captured by the image capture device 11 and where image recognition is performed. The recognition region A may match the capturing region of the image capture device 11 or may be a part of the capturing region of the image capture device 11. The recognition region A may be preset in the POS terminal 100 or may be set by a user.

The support portion 200 is a support structure used for supporting an item B at a predetermined angle relative to the gravity direction on the placement face of the placement stage 14. The support portion 200 may be formed integrally with the placement stage 14 (that is, as a part of the placement stage 14) within the recognition region A or may be formed as a member placed on the placement stage 14. The detailed configuration of the support portion 200 will be described later by using FIG. 2 to FIG. 4.

The display device 13 is a display device that displays any information such as item information to the user (that is, a shop clerk or a customer). As the display device 13, any display device such as a cathode ray tube (CRT) display, a liquid crystal display, or the like may be used.

When an item recognition method is performed, each item B, which is a recognition target, is directly arranged inside the recognition region A on the placement stage 14 or arranged on the support portion 200. Specifically, when an external feature of the item B is naturally arranged to face upward in the gravity direction (that is, face the image capture device 11) when the item B is placed, the item B is directly arranged inside the recognition region A on the placement stage 14. On the other hand, when an external feature of the item B faces the side direction relative to the gravity direction (that is, not face the image capture device 11) when the item B is placed, the item B is arranged on the support portion 200. The item B whose external feature faces the side direction relative to the gravity direction may be, for example, an article such as a beverage can that has a substantially cylindrical shape or an article such as a soft cake contained in a transparent container that may be damaged when laid.

Figure 2:
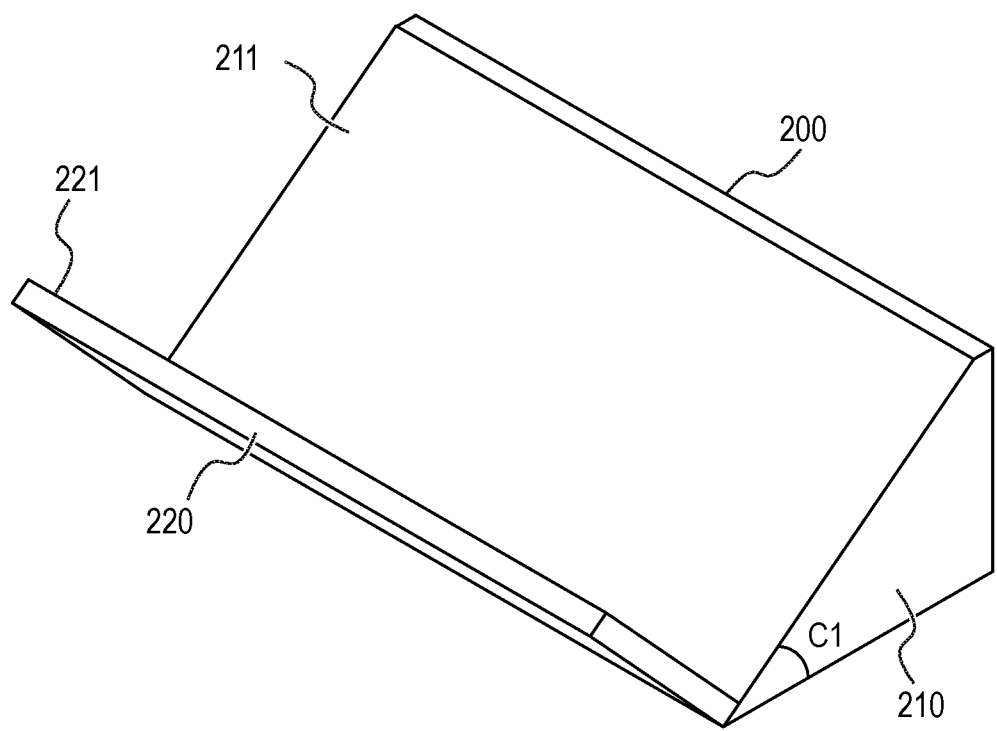
FIG. 2 is a perspective view of a support portion according to the first example embodiment.

FIG. 2 is a perspective view of the support portion 200 as an item support structure according to the present example embodiment. While being formed as a separate member from the placement stage 14 in the present example embodiment, the support portion 200 may be formed such that a part of the placement face of the placement stage 14 serves as the item support structure of FIG. 2. The support portion 200 has a side face support member 210 and a bottom face support member 220. The side face support member 210 has a side face support face 211 that supports the side face of an item, and the bottom face support member 220 has a bottom face support face 221 that supports the bottom face of an item. The side face support member 210 and the bottom face support member 220 are provided such that the side face support face 211 and the bottom face support face 221 are perpendicular to each other (that is, the angle between these faces is 90 degrees) and the side face support face 211 forms a predetermined angle C1 relative to the horizontal direction (that is, the perpendicular direction to the gravity direction). With such a configuration, the support portion 200 can support an item as the angle C1 and facilitate capturing of the side face of an item by the image capture device 11.

The angle C1 is preferably an angle greater than 0 degree and less than 90 degrees and more preferably an angle greater than or equal to 30 degrees and less than or equal to 60 degrees so that the image capture device 11 captures the side face of an item in a stable manner, and the angle C1 is 45 degrees in the present example embodiment. When the angle C1 is an angle greater than 60 degrees relative to the horizontal direction, the side face of an item will be captured at a steep angle from the image capture device 11, and thus accuracy in image recognition decreases. When the angle C1 is an angle less than 30 degrees relative to the horizontal direction, an item having a substantially cylindrical shape may roll or a soft item may be damaged.

Figure 3:
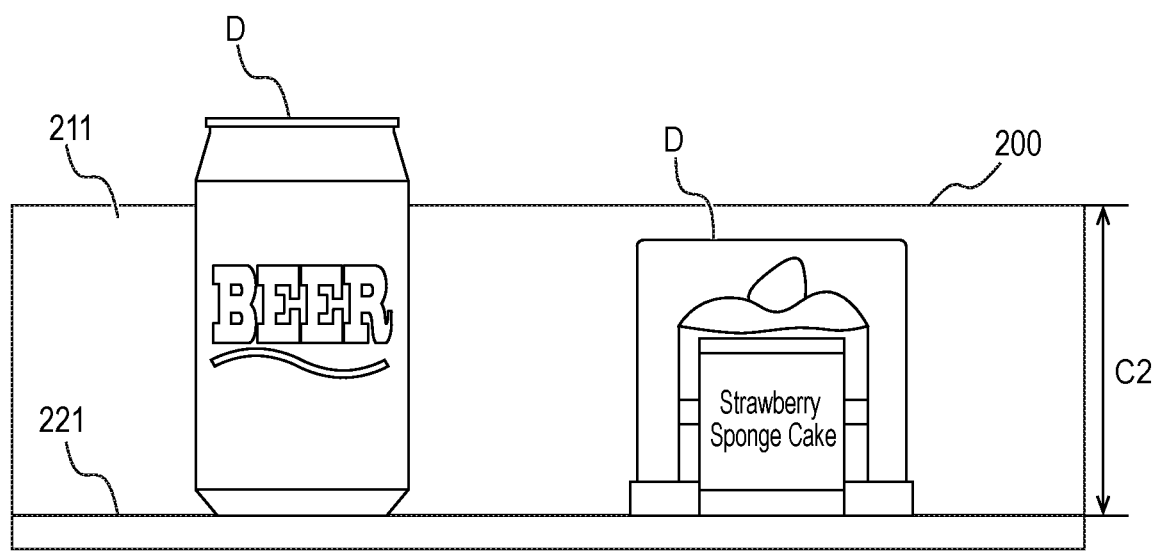
FIG. 3 is a top view of the support portion in a state where items are arranged according to the first example embodiment.

FIG. 3 is a top view of the support portion 200 as the item support structure according to the present example embodiment. FIG. 3 is a view when the support portion 200 supporting an item D is viewed from a direction perpendicular to the side face support face 211. For example, the item D is an article such as a beverage can which has a substantially cylindrical shape or an article such as a soft cake contained in a transparent container which will be damaged by being laid. Since the side face support face 211 supports the side face of the item D and the bottom face support face 221 supports the bottom of the item D in such a way, the support portion 200 can stably support the item D, and the image capture device 11 can easily capture the item D.

It is desirable that a length C2 of the side face support face 211 in a direction perpendicular to the bottom face support face 221 (hereafter, referred to as a height) be less than a length of the substantially cylindrical item D, which is supported by the support portion 200, in the direction perpendicular to the bottom face support face 221 (hereafter, referred to as a height). When the substantially cylindrical item D is a beverage can, a portion of the easy open end is provided on the top in general. When the height C2 of the side face support face 211 is higher than or equal to the height of the item D, the portion of the easy open end may contact with the side face support face 211 when the item D is arranged on the support portion 200. Thus, with the height C2 of the side face support face 211 being lower than the height of the item D, the portion of the easy open end of the item D is less likely to contact with the side face support face 211, and thereby a preferable hygienic state can be obtained.

Since the angle of an item may not be the same when the item is supported by a hand of a human, the angle of an item may vary for each time, a single item may be erroneously recognized as a plurality of items, or accuracy in image recognition may decrease. In contrast, since the support portion 200 supports an item at the predetermined angle C1 in the present example embodiment, accuracy in image recognition can be improved.

Figure 4A:
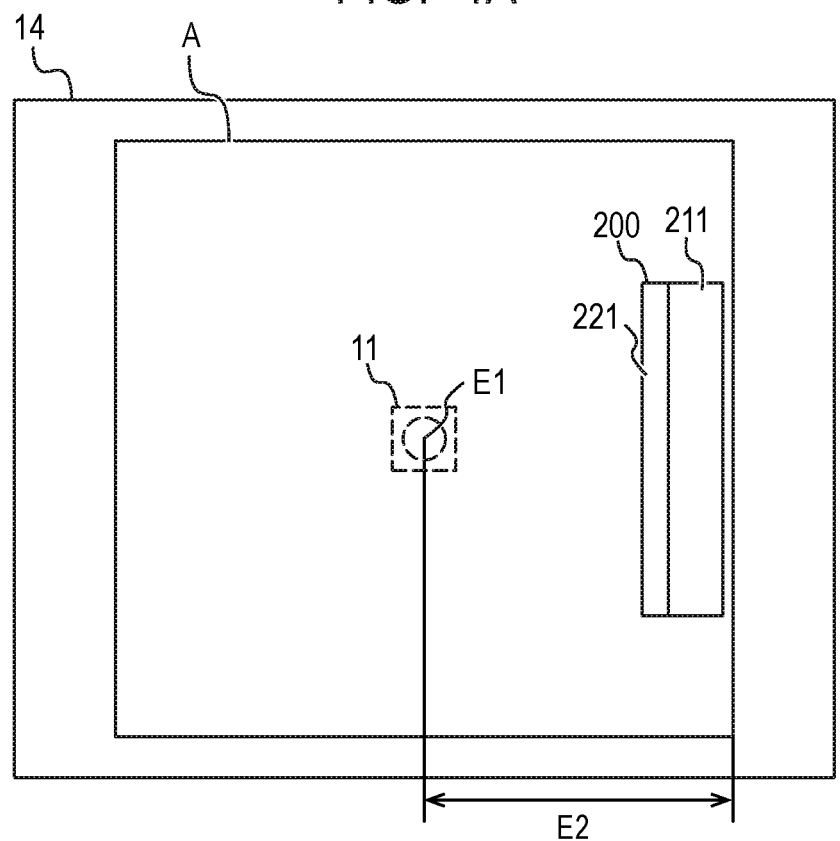
FIG. 4A is a top view of a recognition region on a placement stage according to the first example embodiment.

FIG. 4A is a top view of the recognition region A on the placement stage 14 according to the present example embodiment. In FIG. 4A, a position at which the image capture device 11 is projected on the placement stage 14 is illustrated by a dashed line. The support portion 200 is provided such that the side face support face 211 faces the image capture device 11, that is, the bottom face support face 221 is closer to the image capture device 11 than to the side face support face 211. Thereby, the side face of an item supported by the support portion 200 faces the image capture device 11 and thus can be captured by the image capture device 11.

The support portion 200 is provided in contact with or near the end of the recognition region A. Specifically, it is preferable that the support portion 200 be arranged at a position closer to the end of the recognition region A than to the midpoint of a line E2 between a point E1, at which the optical axis of the image capture device 11 intersects the recognition region A, and the end of the recognition region A. Furthermore, it is more preferable that the support portion 200 be arranged at a position closer to the end of the recognition region A than to a point on the end side of the recognition region A out of trisection points of the line E2.

Figure 4B:
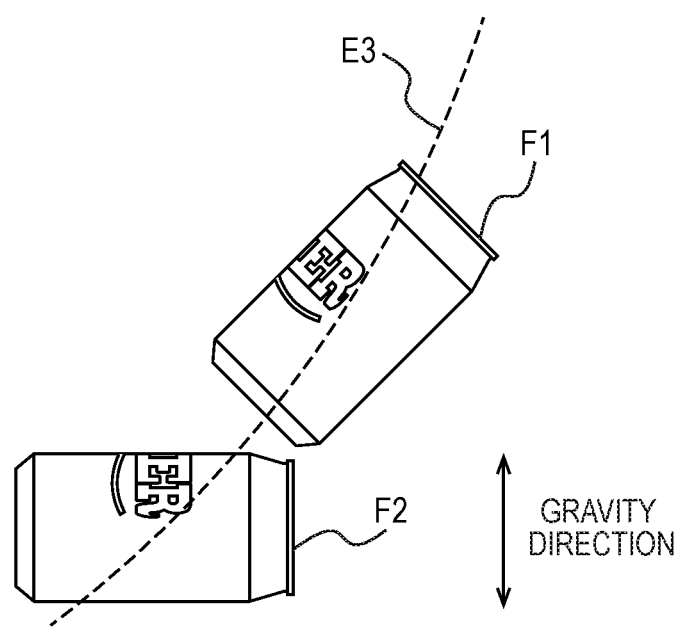
FIG. 4B is a schematic diagram of a plane of light that enters an image capture device from a part near an end of the recognition region on a placement stage according to the first example embodiment.

In the recognition region A, distortion of a captured image is larger for a part that is more distant from the optical axis of the image capture device 11, that is, closer to the end of the view angle of the image capture device 11. This is because a light entering the image capture device 11 in a spherical shape is projected on a plane image. FIG. 4B is a schematic diagram of a plane E3 of a light entering the image capture device 11 from a position near the end of the recognition region A. Near the end of the recognition region A, a direction in which the plane E of a light extends is close to the gravity direction as illustrated in FIG. 4B. Therefore, since the side face of an item F2 placed lying on the placement stage 14 extends in the direction perpendicular to the gravity direction, distortion of an image increases when being captured with a light close to the gravity direction. In contrast, since the direction in which the side face of the item F1 supported by the support portion 200 at a predetermined angle larger than 0 degree extends is close to the direction of a light close to the gravity direction, an influence of distortion of an image is small. In such a way, since the support portion 200 is arranged in contact with or near the end of the recognition region A in the present example embodiment, it is possible to reduce an influence of a view angle of the image capture device 11 and improve accuracy in recognition of an item.

Figure 5:
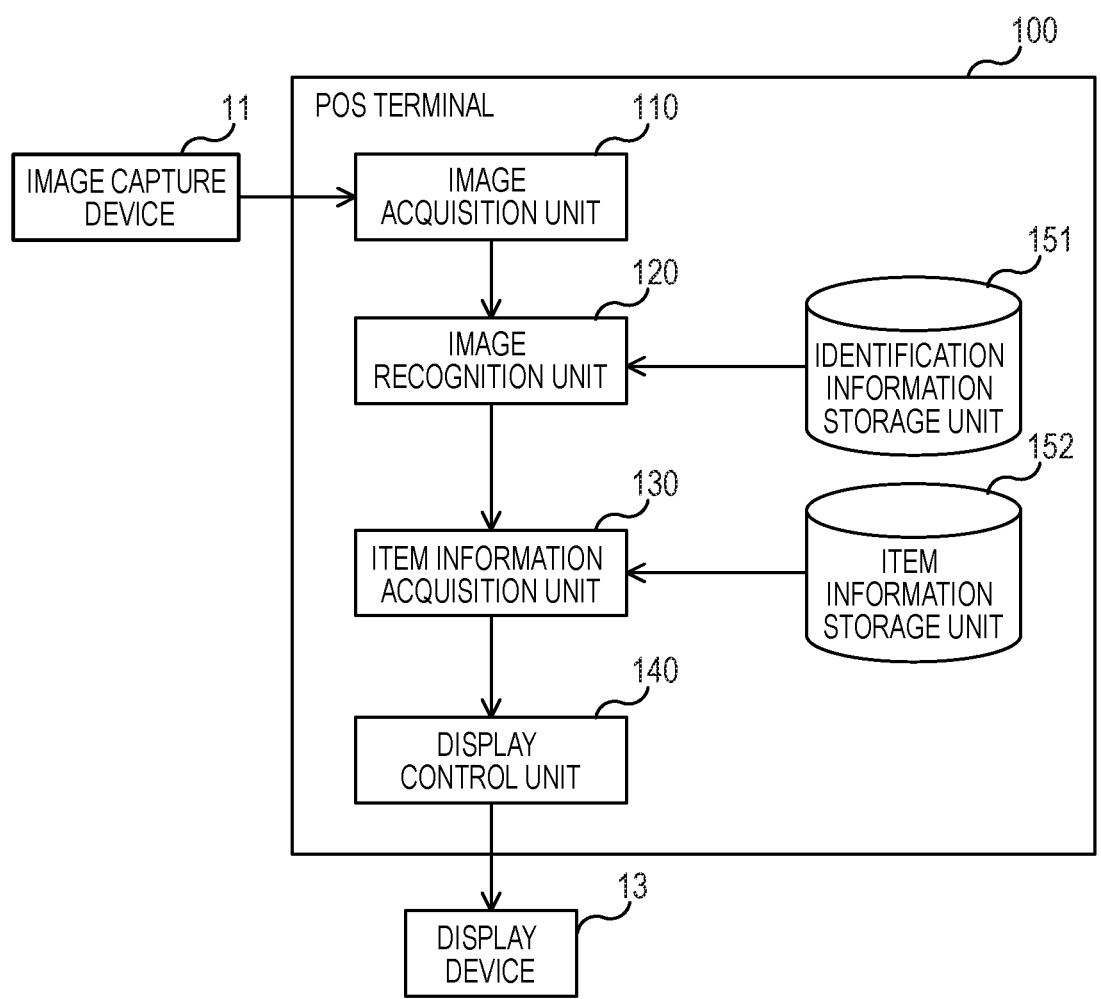
FIG. 5 is a block diagram of a POS terminal according to the first example embodiment.

FIG. 5 is a block diagram of the POS terminal 100 (image recognition apparatus) according to the present example embodiment. In FIG. 5, arrows represent main flows of data, and there may be other flows of data than those illustrated in FIG. 5. In FIG. 5, each block represents a configuration in a function unit rather than a configuration in a hardware (device) unit. Thus, blocks illustrated in FIG. 5 may be implemented inside a single device or may be implemented separately inside the plurality of devices. Data exchange between blocks may be performed via any component such as a data bus, a network, a portable storage medium, or the like.

The POS terminal 100 has, as a processing unit, an image acquisition unit 110, an image recognition unit 120, an item information acquisition unit 130, and a display control unit 140. Further, the POS terminal 100 has, as a storage unit, an identification information storage unit 151 and an item information storage unit 152.

The image acquisition unit 110 receives a signal indicating an image captured by the image capture device 11 and inputs the received signal to the POS terminal 100 as image data. The image data may be directly acquired from the image capture device 11 or may be acquired by reading image data stored in a storage device.

The image recognition unit 120 extracts each item included in image data acquired by the image acquisition unit 110. For example, a feature amount calculated in advance from reference images of various items is stored in the identification information storage unit 151 in association with item IDs used for identifying respective items. As a feature amount, any information indicating external appearance of an item may be used that can be calculated from image data, such as a shape, a color, a color distribution, or the like. The image recognition unit 120 calculates a feature amount from image data acquired by the image acquisition unit 110 and compares the calculated feature amount with a feature amount stored in the identification information storage unit 151. The image recognition unit 120 then identifies, as the item in the image data, an item having most similar feature amount (that is, satisfying a predetermined criterion) in the identification information storage unit 151. The image recognition unit 120 acquires an item ID of the identified item from the identification information storage unit 151. As an item recognition method performed by the image recognition unit 120, any image recognition technology that can identify an item from image data may be used without being limited to the specific method illustrated here.

The image recognition unit 120 performs different processes on an item supported by the support portion 200 and on an item directly placed on the placement stage 14 (that is, not supported by the support portion 200). The angle C1 at which the support portion 200 supports an item and the positional relationship between the image capture device 11 and the support portion 200 are constant and known. Thus, the image recognition unit 120 performs correction on a region corresponding to the support portion 200 in image data by using the angle C1 and the positional relationship between the image capture device 11 and the support portion 200. That is, the image recognition unit 120 uses the angle C1 at which an item is supported and the positional relationship between the image capture device 11 and the support portion 200 to extend an image of an item captured by the image capture device and thereby generates an image that would be obtained when the side face of the item is captured from right in front or an image that would be obtained in a situation close to the above. Since an image corrected in such a way is in a state close to a reference image acquired by capturing an item from right in front in general, accuracy in image recognition described above can be improved.

In the item information storage unit 152, any item information regarding an item such as a name of an item, a price of an item, or the like is pre-stored in association with an item ID. The item information acquisition unit 130 acquires item information stored in the item information storage unit 152 based on an item ID acquired by the image recognition unit 120.

The display control unit 140 performs control to display item information on each item acquired by the item information acquisition unit 130. In the present example embodiment, the display control unit 140 controls a process to visually indicate predetermined information to the user, such as printing of a receipt by a printer, in addition to the display on the display device 13.

Figure 6:
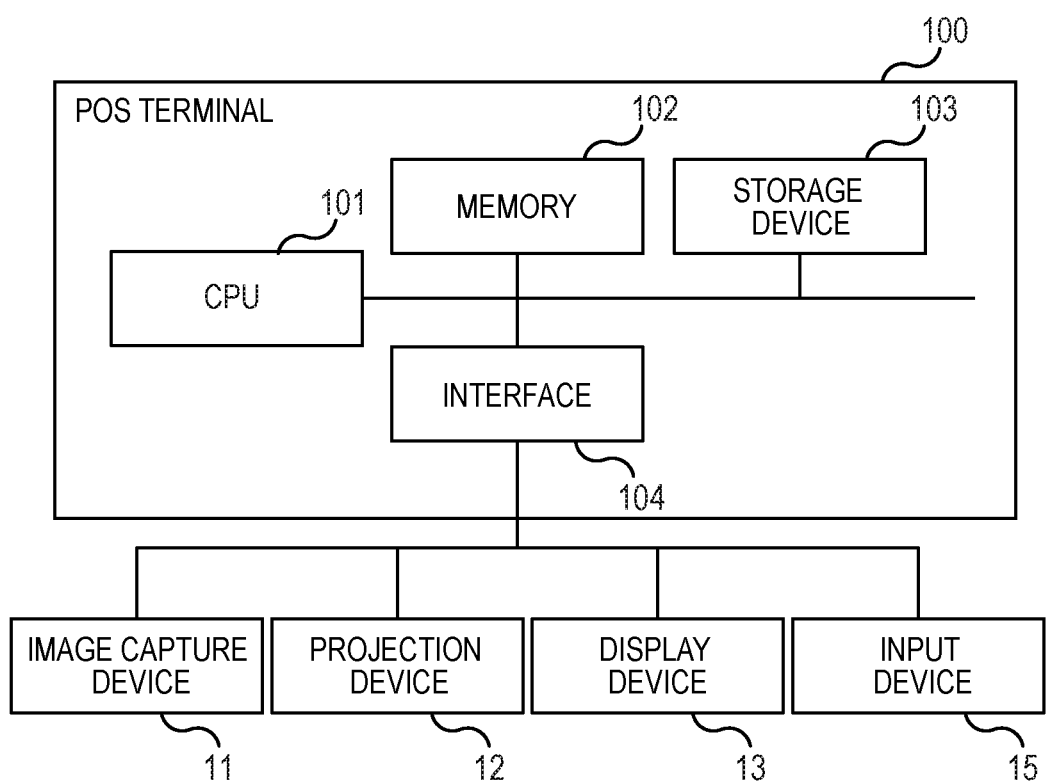
FIG. 6 is a general configuration diagram of the POS terminal according to the first example embodiment.

FIG. 6 is a general configuration diagram illustrating an exemplary device configuration of the POS terminal 100 (image recognition apparatus) according to the present example embodiment. The POS terminal 100 has a central processing unit (CPU) 101, a memory 102, a storage device 103, and an interface 104. The POS terminal 100 may be an independent device or may be formed integrally with another device.

The interface 104 is a connection unit that is connected to another device and transmits and receives a signal. The interface 104 includes a processor, an electric circuit, an antenna, a connection terminal, or the like necessary for transmission and reception of a signal. The interface 104 performs transmission and reception of a signal with a connected device in accordance with a signal from the CPU 101. The interface 104 is connected to the image capture device 11, the projection device 12, the display device 13, and the input device 15 and performs transmission and reception of a signal therewith, for example. The interface 104 may be connected to a network other than the above or other devices.

The storage device 103 stores a program executed by the POS terminal 100, data of a process result obtained by the program, or the like. The storage device 103 includes a read only memory (ROM) dedicated to reading, a hard disk drive or a flash memory that is readable and writable, or the like. Further, the storage device 103 may include a computer readable portable storage medium such as a CD-ROM. The memory 102 includes a random access memory (RAM) or the like that temporarily stores data being processed by the CPU 101 or a program and data read from the storage device 103.

The CPU 101 is a processor that temporarily stores temporary data used for processing in the memory 102, reads a program stored in the storage device 103, and executes various processing operations such as calculation, control, determination, or the like on the temporary data in accordance with the program. Further, the CPU 101 stores data of a process result in the storage device 103 and also externally transmits data or control signals via the interface 104.

In the present example embodiment, the CPU 101 functions as the image acquisition unit 110, the image recognition unit 120, the item information acquisition unit 130, and the display control unit 140 of FIG. 5 by executing a program stored in the storage device 103. Further, in the present example embodiment, the storage device 103 functions as the identification information storage unit 151 and the item information storage unit 152 of FIG. 5.

The POS terminal 100 is not limited to the specific configuration illustrated in FIG. 6. The POS terminal 100 is not limited to a single device and may be configured such that two or more physically separated devices are connected by wired or wireless connection. Respective units included in the POS terminal 100 may be implemented by an electric circuitry, respectively. The electric circuitry here is a term conceptually including a single device, multiple devices, a chipset, or a cloud.

Further, at least a part of the POS terminal 100 may be provided in a form of Software as a Service (SaaS). That is, at least some of the functions for implementing the POS terminal 100 may be executed by software executed via a network.

Figure 7:
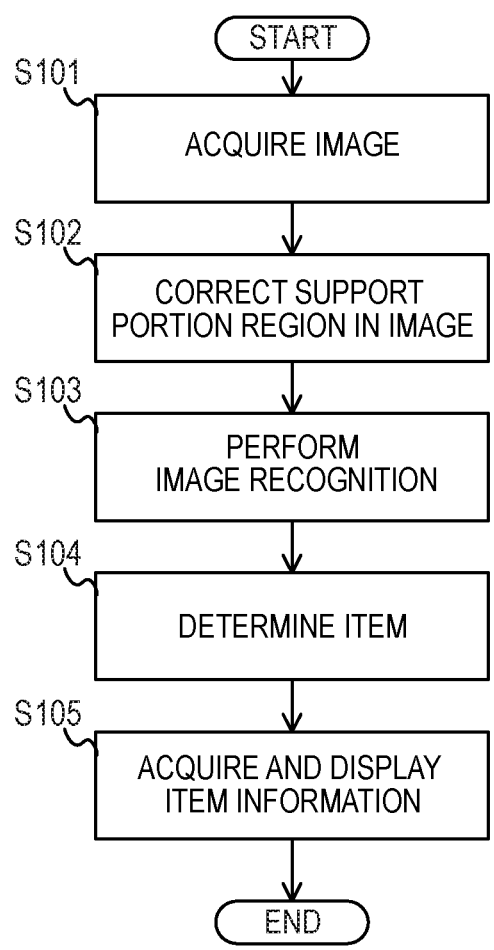
FIG. 7 is a diagram illustrating a flowchart of an image recognition method according to the first example embodiment.

FIG. 7 is a diagram illustrating a flowchart of an image recognition method according to the present example embodiment. The flowchart of FIG. 7 is started by the user performing a predetermined operation to execute image recognition on the image recognition system 10 or at every predetermined time. For example, the flowchart of FIG. 7 is started by the user pressing a button of the input device 15 (a keyboard or a touchscreen) connected to the POS terminal 100.

First, the image acquisition unit 110 receives a signal indicating an image captured by the image capture device 11 and inputs the received signal to the POS terminal 100 as image data (step S101).

Next, the image recognition unit 120 performs correction on a region corresponding to the support portion 200 (support portion region) in the image acquired in step S101 by using the angle C1 of the support portion 200 and the positional relationship between the image capture device 11 and the support portion 200 and outputs the corrected region as one image data (step S102). The support portion region is preset as a position (coordinates) in an image. Further, a position of the support portion 200 may be determined from an image by image recognition to use the position as the support portion region.

Next, the image recognition unit 120 performs an image recognition process on the image data corrected in step S102 and identifies an item based on identification information in the identification information storage unit 151 (step S103). The image recognition unit 120 then determines the item identified in step S103 as the item in the image (step S104). When a plurality of items are identified in one image data, the subsequent process is performed on each item.

Finally, the item information acquisition unit 130 acquires item information from the item information storage unit 152 based on the item ID of the item determined in step S104, and the display control unit 140 performs control to display item information by using the display device 13 (step S105).

In particular, when the flowchart of FIG. 7 is performed at every predetermined time, item information may be repeatedly acquired on the same item left placed on the placement stage 14, and the price of the same item may be collected for multiple times in payment. Accordingly, when the image recognition unit 120 identifies the same item at close positions within a predetermined time period or a predetermined number of frames (for example, the difference in positions of the centroids is below a predetermined value), the item information acquisition unit 130 does not perform acquisition of item information on the item in step S105 (not illustrated in the flowchart of FIG. 7).

The CPU 101 of the POS terminal 100 is the subject of each step (process) included in the image recognition method illustrated in FIG. 7. That is, the CPU 101 performs the image recognition method illustrated in FIG. 7 by reading a program to perform the image recognition method illustrated in FIG. 7 from the memory 102 or the storage device 103 and executing the program to control each unit of the POS terminal 100.

The image recognition system 10 according to the present example embodiment captures an item supported by the support portion 200 at a predetermined angle from the image capture device 11 provided upward in the gravity direction and performs image recognition. Since image recognition on the side face of an item can be performed by using only one image capture device, it is possible to realize a lower-cost and simpler process than the process when an item from multiple directions is captured by providing a plurality of image capture devices or moving an image capture device. Since the support portion 200 stably supports an item in the gravity direction, the image capture device 11 can easily capture the side face of the item and improve accuracy in image recognition compared to a case where an item is supported by a human's hand.

Further, since an item directly placed on the placement stage 14 and an item supported by the support portion 200 at a predetermined angle can be recognized at the same time, the user is not required to perform an additional operation.

Further, since the support portion 200 supports an item such that the side face of the item is slantwise relative to the horizontal direction, the item is less likely to roll, and stable image recognition can be performed. Furthermore, since the angle at which the support portion 200 supports an item is fixed and known, an image of an item can be corrected by using the angle. This can further improve accuracy in image recognition.

Further, since the support portion 200 is provided near the end of the recognition region A, the side face of an item can be supported along a sphere of a light entering the image capture device 11. This can reduce an influence of distortion at the end of the view angle of the image capture device 11 and further improve accuracy in image recognition.

Second Example Embodiment

While the support portion 200 according to the first example embodiment facilitates capturing of the side face of an item by supporting the item slantwise, the support portion 200 according to the present example embodiment supports an item such that the side face of the item is parallel to the horizontal direction. With such a configuration, the image capture device 11 can easily capture the side face of an item. The present example embodiment uses the image recognition system 10 having the same configuration as that in the first example embodiment. The support portion 200 according to the present example embodiment may be used instead of the support portion 200 according to the first example embodiment or may be used in addition to the support portion 200 according to the first example embodiment.

Figure 8:
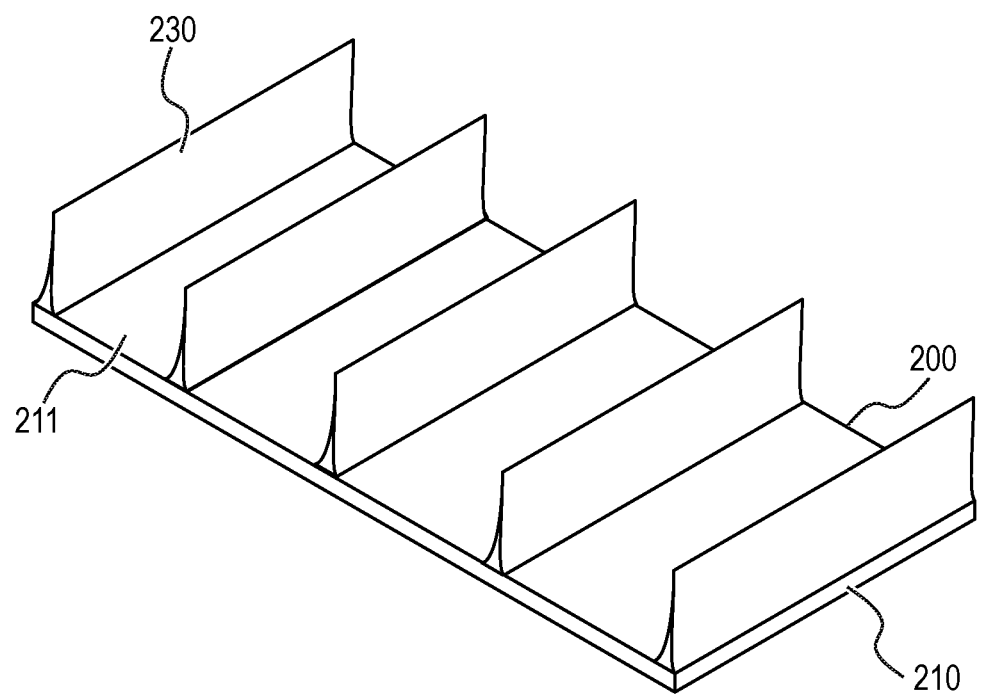
FIG. 8 is a perspective view of a support portion according to a second example embodiment.

FIG. 8 is a perspective view of the support portion 200 as an item support structure according to the present example embodiment. The support portion 200 may be formed as a separate member from the placement stage 14 or may be formed such that a part of the placement face of the placement stage 14 serves as the item support structure of FIG. 8.

The support portion 200 has the side face support member 210. The side face support member 210 has the side face support face 211 that supports the side face of an item. The side face support face 211 is provided to be parallel to the horizontal direction (that is, the direction perpendicular to the gravity direction). That is, in the present example embodiment, the angle C1 of the side face support face 211 in the first example embodiment relative to the horizontal direction is set to 0 degree. With such a configuration, the support portion 200 can support an item such that the side face of an item faces the image capture device 11, and capturing of the side face of the item by the image capture device 11 can be facilitated.

Furthermore, any number, two or greater, of protrusion portions 230 are provided on the side face support face 211. The protrusion portions 230 are provided in parallel to each other along the side face of an item to be arranged. With such a protrusion portions 230, since the orientation of an item is restricted, the user may easily arrange an item on the support portion 200 at a predetermined orientation.

The spacing between the protrusion portions 230 is substantially the same as the width of an item to be arranged, and is preferably set to a value of the width of an item to be arranged plus a predetermined margin (for example, approximately 2% to 10% of the width). This can suppress a cylindrical item or a spherical item from rolling and stabilize image recognition performed on the side face of the item.

While the bottom face support member 220 is omitted in the present example embodiment, the bottom face support member 220 may be provided so as to contact vertically with the side face support member 210 and the protrusion portion 230. Contrarily, the protrusion portions 230 may be provided on the support portion 200 according to the first example embodiment.

With the use of the support portion 200 according to the present example embodiment, in the same manner as the first example embodiment, the image capture device 11 can easily capture the side face of an item, and accuracy in image recognition can be improved compared to a case where an item is supported by a human's hand.

Third Example Embodiment

The present example embodiment further performs image recognition based on the position where an item is arranged in the image recognition system 10 according to the first or second example embodiment. That is, in the present example embodiment, different image recognition processes are performed for respective positions (regions) where items are arranged.

Figure 9:
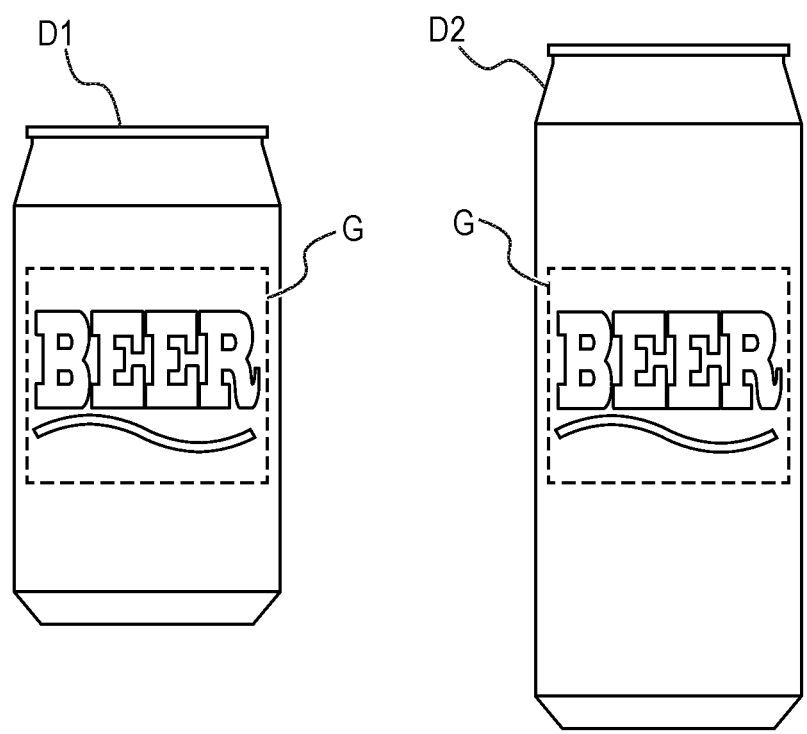
FIG. 9 is a schematic diagram of items that are recognition target in a third example embodiment.

FIG. 9 is a schematic diagram of items D1 and D2 that are targets for recognition in the present example embodiment. The items D1 and D2 are articles each having a substantially cylindrical shape such as a beverage can. The items D1 and D2 have different sizes from each other, for example, the volume of the item D1 is 350 ml, and the volume of the item D2 is 500 ml. A common logo G is represented on the side faces of the items D1 and D2. That is, the items D1 and D2 are items of variation of different sizes. A general image recognition technology performs image recognition based on a feature amount of external appearance such as a shape, a color, a color distribution, or the like in image data. Thus, the items D1 and D2 having the common logo G are less likely to be distinguished by such image recognition and are likely to be erroneously recognized as the same item.

In the present example embodiment, accuracy in image recognition is improved for the items D1 and D2 having such similar external appearance by using information on the position, the region, or the coordinate at which the items D1 and D2 are arranged.

In the image recognition process according to the present example embodiment, the image recognition unit 120 determines whether or not an item included in an image is a target for an identification process by using a coordinate (position) at which the item is arranged and performs the identification process by using the coordinates on the target item. Whether or not it is a target for an identification process using coordinates is preset for each item as a coordinate determination flag. For example, the items D1 and D2 of FIG. 9 are items in variation with different sizes and thus are target for an identification process using coordinates. Thereby, even with items in variation with different sizes, it is possible to selectively identify an item having any one of the sizes based on the position of the item arranged by the user.

Figure 10A:
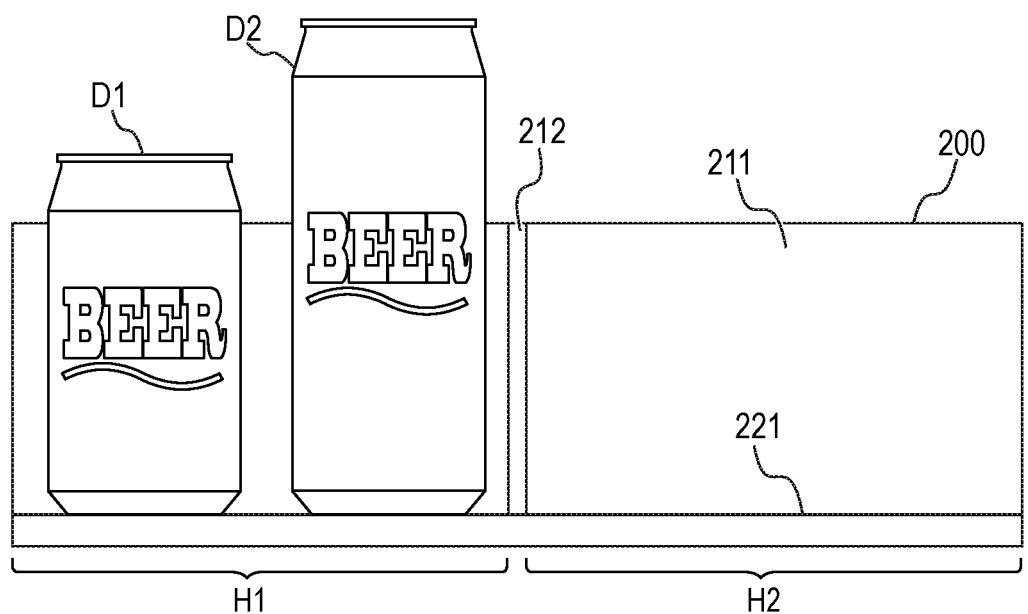
FIG. 10A is a top view of a support portion in a state where items are arranged according to the third example embodiment.
Figure 10B:
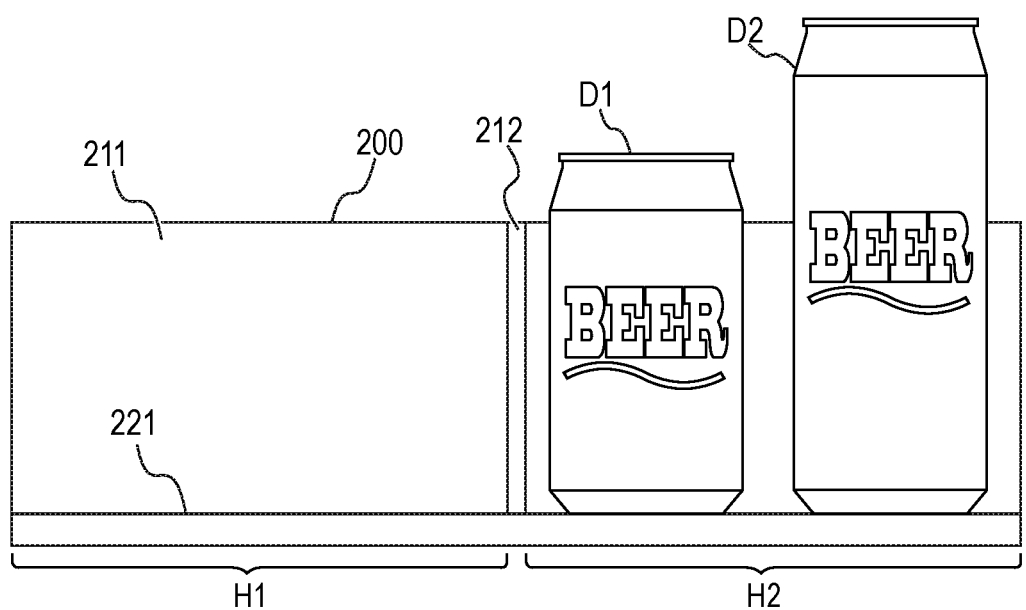
FIG. 10B is a top view of the support portion in a state where items are arranged according to the third example embodiment.

FIG. 10A and FIG. 10B are top views of the support portion 200 in a state where items are arranged thereon. FIG. 10A and FIG. 10B are diagrams when the support portion 200 supporting the items D1 and D2 is viewed from the direction perpendicular to the side face support face 211, respectively. Since the side face support face 211 supports the side faces of the items D1 and D2 and the bottom face support face 221 supports the bottom faces of the items D1 and D2 as illustrated in FIG. 10A and FIG. 10B, the support portion 200 can stably support the items D1 and D2 and facilitate capturing of the side face of the items D1 and D2 by the image capture device 11.

Figure 10C:
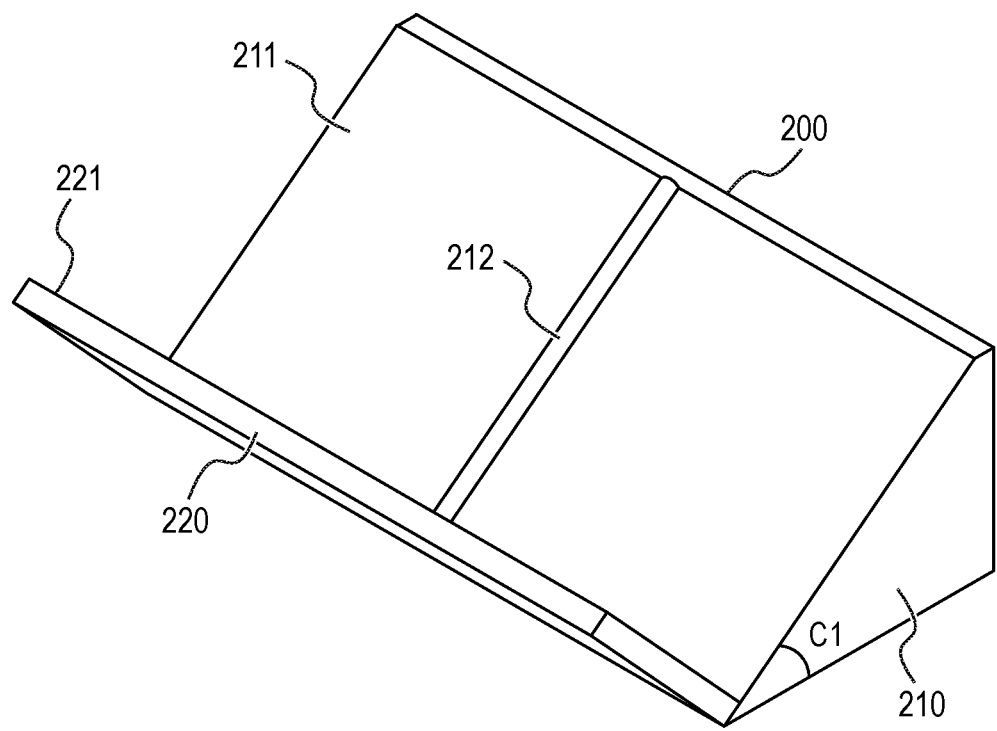
FIG. 10C is a perspective view of a support portion according to the third example embodiment.

FIG. 10C is a perspective view of the support portion 200 as the item support structure according to the present example embodiment. In addition to the configuration of FIG. 2, a region partition portion 212 that partitions the side face support face 211 into two regions is provided on the side face support face 211, as illustrated in FIG. 10C. The region partition portion 212 is a protrusion portion extending in the direction perpendicular to the bottom face support face 221 on the side face support face 211. The region partition portion 212 may be a symbol or color expressed on the side face support face 211, a light projected by the projection device 12, or a structure provided on the side face support face 211 as long as it can visually indicate a region to the user.

The side face support face 211 is partitioned by the region partition portion 212 into a first region H1 and a second region H2. The image recognition unit 120 performs a different recognition process in accordance with which of the regions H1 and H2 an item is arranged in (that is, in accordance with the position at which an item is arranged).

For determination of the regions H1 and H2, the image recognition unit 120 may preset information as to which of the regions H1 and H2 each pixel in an image acquired by the image capture device 11 belongs to and, based on a pixel corresponding to the position of an item, determine which of the regions H1 and H2 the item is arranged in. Alternatively, the image recognition unit 120 may recognize the position of the region partition portion 212 and, based on the positional relationship between the position of the region partition portion 212 and the item, determine which of the regions H1 and H2 the item is arranged in.

For example, when the items D1 and D2 are arranged in the first region H1, the image recognition unit 120 determines that the items D1 and D2 are small items. That is, in the example of FIG. 10A, both the small item D1 and the large item D2 are determined to be small items. Further, when the items D1 and D2 are arranged in the second region H2, the image recognition unit 120 determines that the items D1 and D2 are large items. That is, in the example of FIG. 10B, both the small item D1 and the large item D2 are determined to be large items. In the actual operation, by the user arranging the small item D1 in the first region H1 and arranging the large item D2 in the second region H2, the image recognition unit 120 can correctly identify the similar items D1 and D2 having different sizes.

In other words, the image recognition unit 120 identifies an item based on information on the position at which an item is arranged in addition to information on external appearance of the item. Thereby, accuracy in identification can be improved for an item that is difficult to be identified only from the external appearance of the item.

The number of regions used by the image recognition unit 120 is not limited to two and may be any number of at least two or greater in accordance with the number of sizes to be distinguished. Further, the image recognition unit 120 may use information on a position used for distinguishing other properties (variation of taste, flavor, or the like) of items that are difficult to be distinguished from only the external appearance without being limited to the size of an item.

Figure 11:
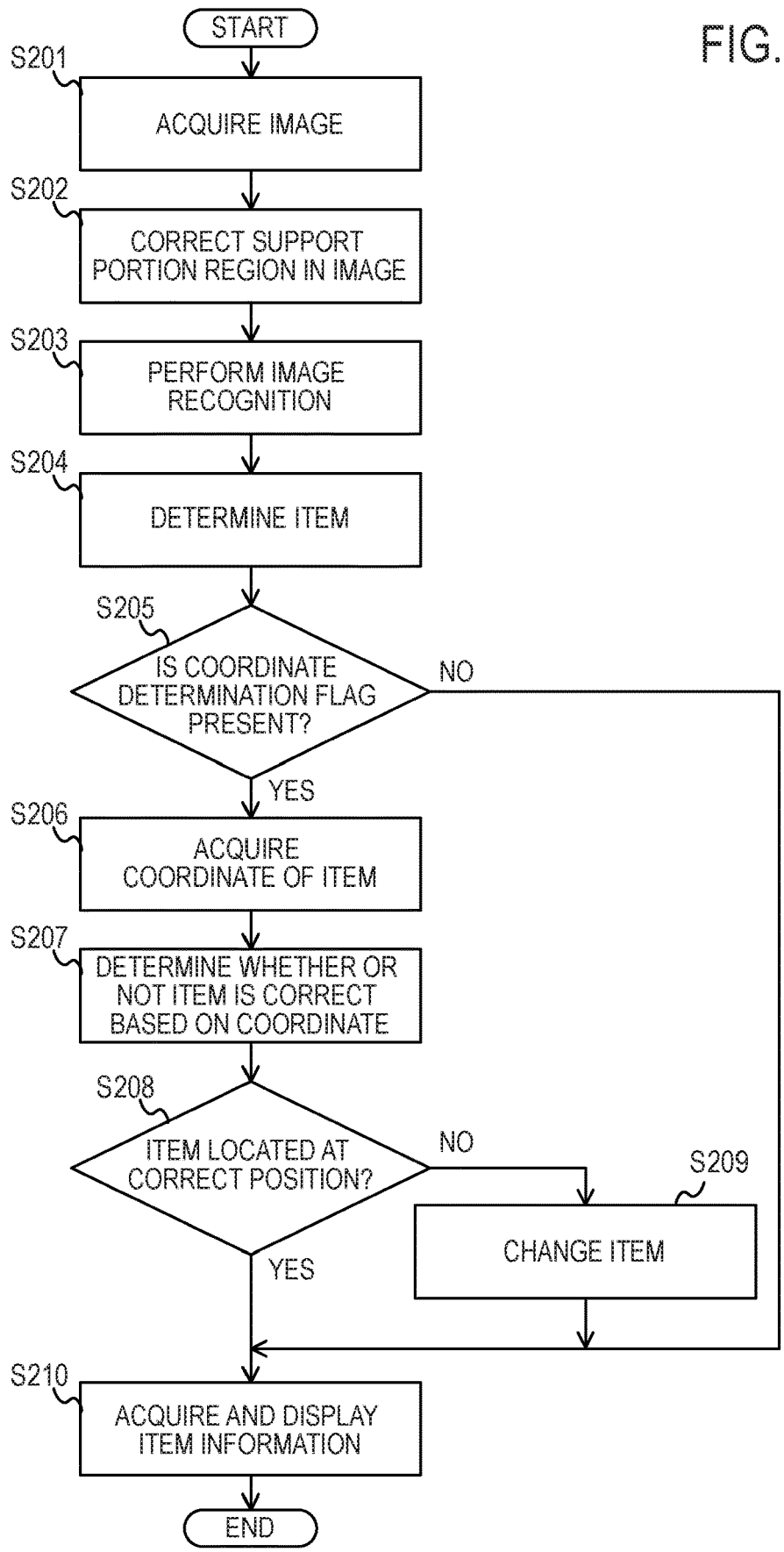
FIG. 11 is a diagram illustrating a flowchart of an image recognition method according to the third example embodiment.

FIG. 11 is a diagram illustrating a flowchart of the image recognition method according to the present example embodiment. The flowchart of FIG. 11 is started by the user performing a predetermined operation to execute image recognition on the image recognition system 10 or at every predetermined time. For example, the flowchart of FIG. 11 is started by the user pressing a button of the input device 15 (a keyboard or a touchscreen) connected to the POS terminal 100.

First, the image acquisition unit 110 receives a signal indicating an image captured by the image capture device 11 and inputs the received signal to the POS terminal 100 as image data (step S201).

Next, the image recognition unit 120 performs correction on a region corresponding to the support portion 200 (support portion region) in the image acquired in step S201 by using the angle C1 of the support portion 200 and the positional relationship between the image capture device 11 and the support portion 200 and outputs the corrected region as one image data (step S202). The support portion region is preset as a position (for example, coordinates of a pixel) in an image. Further, a position of the support portion 200 may be determined from an image by image recognition and use the position as the support portion region.

The image recognition unit 120 performs an image recognition process on an item by using the image data corrected in step S202 and identifies an item based on identification information in the identification information storage unit 151 (step S203). The image recognition unit 120 then determines the item identified in step S203 as the item in the image (step S204). When a plurality of items are identified in one image data, the subsequent process is performed on each item.

If a coordinate determination flag is set for the item determined in step S204 (step S205, YES), the image recognition unit 120 acquires coordinates (position) of an item in the image (step S206). The coordinate determination flag is preset for an item that is a target for an identification process by using coordinates at which the item is arranged. The coordinate determination flag is stored in the identification information storage unit 151, for example. The coordinates of the item are represented as a set of coordinates indicating regions of items in the image, for example. The acquisition of the coordinates of the item in step S206 may be performed after the determination of the coordinate determination flag in step S205 as illustrated in FIG. 11 or may be performed together with the image recognition in step S203.

The image recognition unit 120 determines whether or not the item determined in step S204 is correct based on the coordinates of the item acquired in step S206 (step S207). Specifically, the image recognition unit 120 determines that a correct item is determined if the coordinates of the item acquired in step S206 are inside a region corresponding to the item determined in step S204. On the other hand, the image recognition unit 120 determines that an erroneous item is determined if the coordinates of the item acquired in step S206 are outside a region corresponding to the item determined in step S204.

For example, the following process is performed. It is assumed here that there are two types of items, which are a small item and a large item as illustrated in FIG. 10A and FIG. 10B for simplified illustration. The image recognition unit 120 acquires a correct position (the first region H1 or the second region H2) corresponding to the item determined in step S204. The correct position of an item is preset. In the example of FIG. 10A and FIG. 10B, the correct position of the small item is the first region H1, and the correct position of the large item is the second region H2. The image recognition unit 120 then determines whether or not the coordinates of the item acquired in step S206 are located at the correct position (the first region H1 or the second region H2) corresponding to the item of interest. While this determination may be performed with any method, the position of an item may be determined to be in the first region H1 when a half or more the pixels corresponding to an item is inside a region corresponding to the first region H1 in the image and, otherwise, may be determined to be in the second region H2, for example. Alternatively, the position of an item may be determined to be in the first region H1 when the center (centroid) of a region of an item is in the first region H1 and, otherwise, may be determined to be in the second region H2. Regions in an image corresponding to the first region H1 and the second region H2 may be preset by the user or may be set by the image recognition unit 120 performing image recognition on the region partition portion 212 that partitions the first region H1 and the second region H2.

The number of types of items or the number of regions is not limited to two and may be any number of at least two or greater, and in such a case, classification in accordance with regions in which items are arranged may be appropriately applied.

If the item is not located at the correct position (step S208, NO), the item determined in step S204 is changed to a correct item (step S209). The correct item is an item corresponding to a region including the coordinates of the item acquired in step S206. In the example of FIG. 10A and FIG. 10B, the correct item is a small item if the coordinates of the item acquired in step S206 are inside the first region H1, and the correct item is a large item if the coordinates of the item acquired in step S206 are inside the second region H2.

If no coordinate determination flag is set for the item determined in step S204 (step S205, NO) or if the item is located at the correct position (step S208, YES), the item determined in step S204 is directly used.

Finally, the item information acquisition unit 130 acquires item information from the item information storage unit 152 based on the item ID of the item determined in step S204 or the item changed in step S209, and the display control unit 140 performs control to display item information by using the display device 13 (step S210).

In particular, when the flowchart of FIG. 11 is performed at every predetermined time, item information may be repeatedly acquired on the same item left placed on the placement stage 14, and the price of the same item may be collected for multiple times in payment. Accordingly, when the image recognition unit 120 identifies the same item at close positions within a predetermined time period or a predetermined number of frames (for example, the difference in positions of centroids is below a predetermined value), the item information acquisition unit 130 does not perform acquisition of item information on the item in step S110 (not illustrated in the flowchart of FIG. 11).

While an item is temporarily determined in step S204 and the item is changed to a correct item in step S209 if the coordinates of the item are in an erroneous region in the flowchart of FIG. 11, the process is not limited to this specific form. For example, a plurality of candidates of items similar to an item in an image may be extracted in step S204, and a candidate whose coordinates are in a correct region out of the plurality of candidates may be determined as the item in the image.

The CPU 101 of the POS terminal 100 is the subject of each step (process) included in the image recognition method illustrated in FIG. 11. That is, the CPU 101 performs the image recognition method illustrated in FIG. 11 by reading a program to perform the image recognition method illustrated in FIG. 11 from the memory 102 or the storage device 103 and executing the program to control each unit of the POS terminal 100.

The image recognition system 10 according to the present example embodiment performs image recognition on an item by using the position at which an item is arranged in addition to external appearance of an item. Thereby, for items that are difficult to be distinguished by image recognition only from the external appearance of the items (beverage cans having similar external appearance but having different sizes in the present example embodiment), the results of image recognition can be reduced based on the position at which an item is arranged, and therefore accuracy in image recognition can be improved.

Further, since the angle at which the support portion 200 supports an item is fixed and known, an image of an item can be corrected by using the angle. This can further improve accuracy in image recognition.

Fourth Example Embodiment

Further, while information on a position is used for facilitating identification of items having different sizes in the third example embodiment, information on a position is used for facilitating identification of items of different types in the present example embodiment. The present example embodiment uses the image recognition system 10 having the same configuration as that of the third example embodiment. The present example embodiment may be used instead of any one of the first to third example embodiments or may be used in combination with at least any one of the first to third example embodiments.

Figure 12:
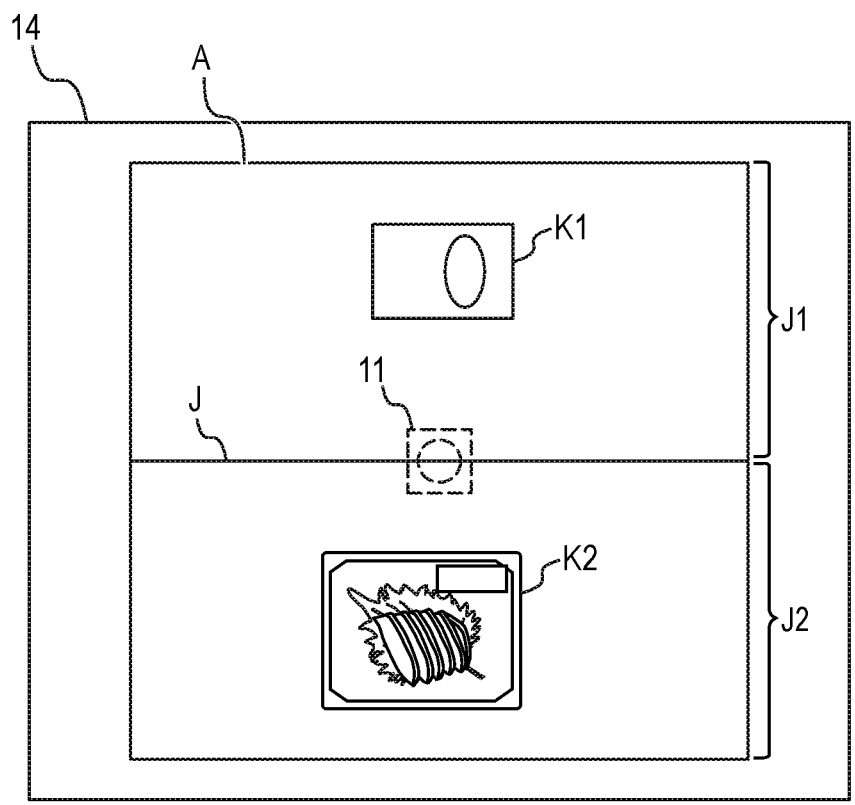
FIG. 12 is a top view of a recognition region on a placement stage according to a fourth example embodiment.

FIG. 12 is a top view of the recognition region A on the placement stage 14 according to the present example embodiment. In FIG. 12, a position at which the image capture device 11 is projected on the placement stage 14 is illustrated by a dashed line.

The recognition region A is partitioned by a region partition line J into a first region J1 and a second region J2. The region partition line J is a line indicated on the recognition region A. The region partition line J may be a symbol or color expressed on the recognition region A, a light projected by the projection device 12, or a structure provided on the recognition region A as long as it can visually indicate a region to the user. The image recognition unit 120 performs a recognition process that is different in accordance with which of the regions J1 and J2 an item is arranged in (that is, the position at which an item is arranged).

For determination of the regions J1 and J2, the image recognition unit 120 may preset information as to which of the regions J1 and J2 each pixel in an image acquired by the image capture device 11 belongs to and, based on a pixel corresponding to the position of an item, determine which of the regions J1 and J2 the item is arranged in. Alternatively, the image recognition unit 120 may recognize the position of the region partition line J and, based on the positional relationship between the position of the region partition line J and the item, determine which of the regions J1 and J2 the item is arranged in.

A first type of item K1 and a second type of item K2 that are targets for recognition in the present example embodiment are different types of items from each other. Specifically, the item K1 is a general article that is enclosed in a package indicating the content of the item and has a constant external appearance. A general article has a stable external appearance and thus is easy to be identified by an image recognition process using external appearance. On the other hand, the item K2 is fresh food that is not enclosed in a package or is enclosed in a transparent package with the item being visible. Fresh food has various external appearance regarding a shape, a color, or the like and thus is difficult to be identified by an image recognition process using external appearance. Fresh food is often attached with a label indicating an item name, a price, and a barcode.

For example, when an item is arranged in the first region J1, the image recognition unit 120 performs an image recognition process as the item being a general article. That is, in the example of FIG. 12, an image recognition process for a general article is performed on the item K1. When an item is arranged in the second region J2, the image recognition unit 120 performs an image recognition process as the item being fresh food. That is, in the example of FIG. 12, an image recognition process for fresh food is performed on the item K2.

The image recognition process for a general article performs identification by using a feature amount (a shape, a color, a color distribution, or the like) calculated from the whole item. The image recognition process for fresh food performs identification by using a feature amount calculated from a region inside a label attached to the item rather than the whole item. Thereby, while normal image recognition is applied to a general article, image recognition is applied by using information on a label having a stable external appearance for fresh food having indefinite external appearance, and thus accuracy in image recognition can be improved. As a specific image recognition process on respective types of items, any method suitable for the type may be used without being limited to those illustrated here.

In the actual operation, by the user arranging the item K1, which is a general article, in the first region J1 and arranging the item K2, which is fresh food, in the second region J2, the image recognition unit 120 can apply suitable image recognition processes for the different types of the items K1 and K2, respectively.

In other words, the image recognition unit 120 identifies an item based on information on the position at which an item is arranged in addition to information on external appearance of the item. Thereby, a suitable image recognition process can be selected in accordance with the position at which the item is arranged and accuracy in identification can be improved.

The number of regions used by the image recognition unit 120 is not limited to two and may be any number of at least two or greater in accordance with the type of types of items to be distinguished.

Figure 13:
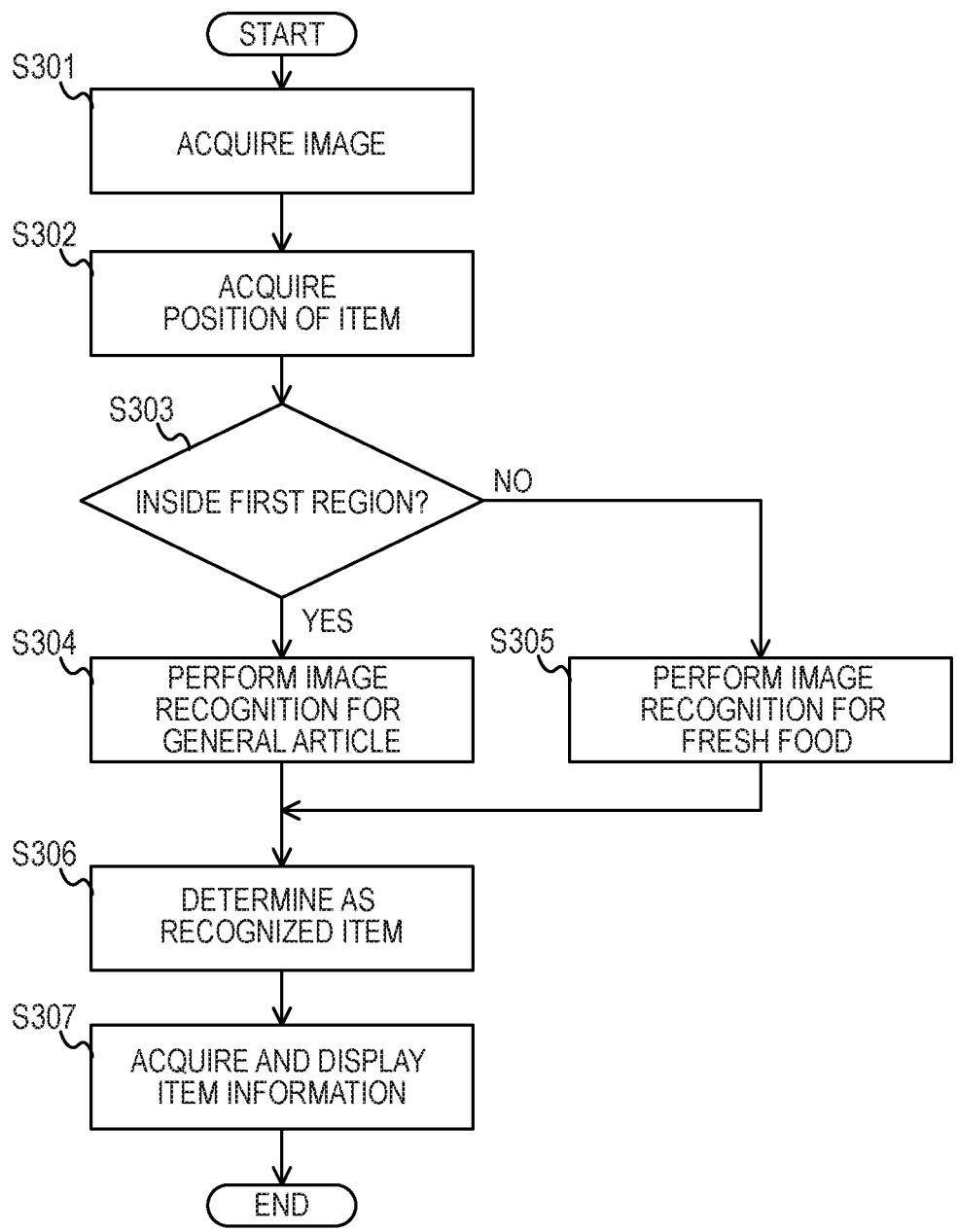
FIG. 13 is a diagram illustrating a flowchart of an image recognition method according to the fourth example embodiment.

FIG. 13 is a diagram illustrating a flowchart of an image recognition method according to the present example embodiment. The flowchart of FIG. 13 is started by the user performing a predetermined operation to execute image recognition on the image recognition system 10. For example, the flowchart of FIG. 13 is started by the user pressing a button of the input device 15 (a keyboard or a touchscreen) connected to the POS terminal 100 or at every predetermined time.

First, the image acquisition unit 110 receives a signal indicating an image captured by the image capture device 11 and inputs the received signal to the POS terminal 100 as image data (step S301).

Next, the image recognition unit 120 acquires the position of an item in the image acquired in step S301 (step S302). The following steps S303 to S307 are performed for each item detected in the image.

The image recognition unit 120 determines which of the first region J1 and the second region J2 of the recognition region A the position of an item is located in. While this determination may be performed with any method, the position of an item may be determined to be in the first region J1 when a half or more the pixels corresponding to an item is inside a region corresponding to the first region J1 in the image and, otherwise, may be determined to be in the second region J2, for example. Regions in an image corresponding to the first region J1 and the second region J2 may be preset by the user or may be set by the image recognition unit 120 performing image recognition on the region partition line J that partitions the first region J1 and the second region J2.

If the position of the item acquired in step S302 is inside the first region J1 (step S303, YES), the image recognition unit 120 performs an image recognition process used for a general article on the item of interest and identifies the item based on identification information in the identification information storage unit 151 (step S304).

If the position of the item acquired in step S302 is inside the second region J2 (step S303, NO), the image recognition unit 120 performs an image recognition process used for fresh food on the item of interest and identifies the item based on identification information in the identification information storage unit 151 (step S305).

The image recognition unit 120 then determines the item identified in step S304 or S305 as the item in the image (step S306).

Finally, the item information acquisition unit 130 acquires item information from the item information storage unit 152 based on the item ID of the item determined in step S306, and the display control unit 140 performs control to display item information by using the display device 13 (step S307).

The CPU 101 of the POS terminal 100 is the subject of each step (process) included in the image recognition method illustrated in FIG. 13. That is, the CPU 101 performs the image recognition method illustrated in FIG. 13 by reading a program to perform the image recognition method illustrated in FIG. 13 from the memory 102 or the storage device 103 and executing the program to control each unit of the POS terminal 100.

The image recognition system 10 according to the present example embodiment performs image recognition on an item by using position on the position at which an item is arranged in addition to an external appearance of an item in the same manner as the third example embodiment. Thereby, a suitable image recognition process can be performed for each type of item (a general article and fresh food in the present example embodiment) based on the position at which an item is arranged, and therefore accuracy in image recognition can be improved.

Fifth Example Embodiment

Further, while information on a position is used for facilitating identification of items having different sizes in the third example embodiment, information on a position is used for improving accuracy in image recognition even when the environment is different for positions in a recognition region in the present example embodiment. The present example embodiment uses the image recognition system 10 having the same configuration as that of the third example embodiment. The present example embodiment may be used instead of any one of the first to fourth example embodiments or may be used in combination with any one of the first to fourth example embodiments.

Figure 14:
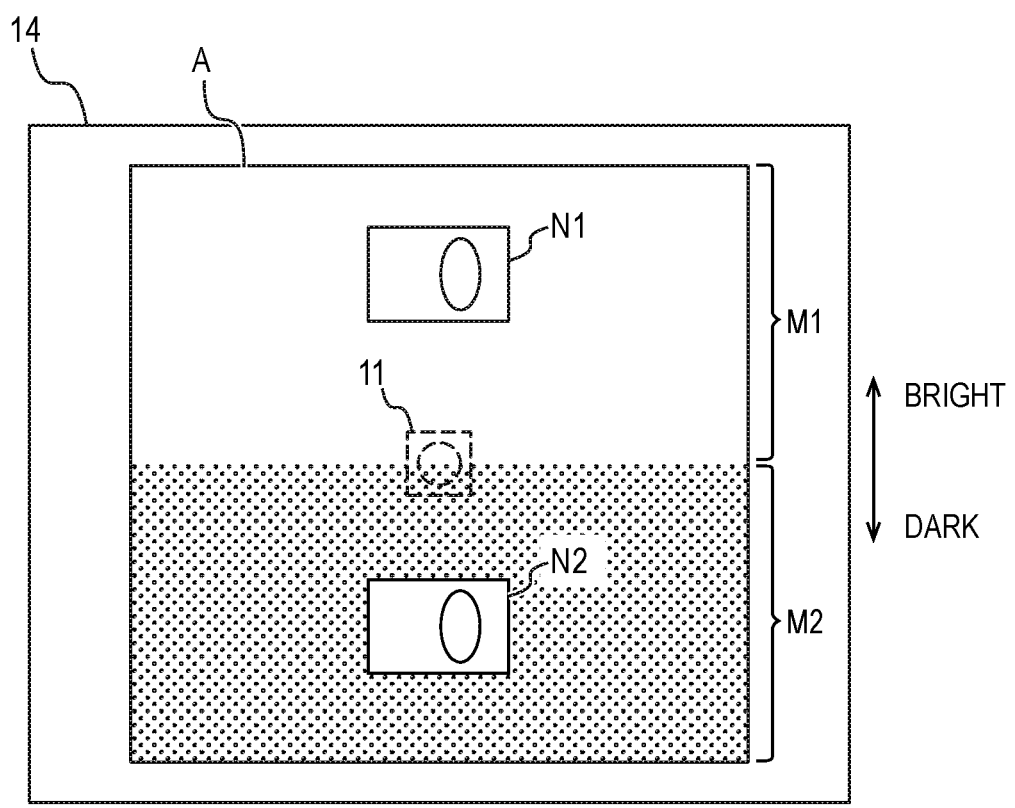
FIG. 14 is a top view of a recognition region on a placement stage according to a fifth example embodiment.

FIG. 14 is a top view of the recognition region A on the placement stage 14 according to the present example embodiment. In FIG. 14, a position at which the image capture device 11 is projected on the placement stage 14 is illustrated by a dashed line.

The recognition region A is partitioned into a first region M1 and a second region M2 by being provided in different colors in respective regions. FIG. 14 illustrates that the first region M1 is different from the second region M2 in color by representing many dots in the second region M2. Each region may be represented by a symbol or color expressed on the recognition region A, a light projected by the projection device 12, or a structure provided on the recognition region A as long as it can visually indicate a region to the user. The image recognition unit 120 performs a recognition process that is different in accordance with which of the regions M1 and M2 an item is arranged in (that is, the position at which an item is arranged).

For determination of the regions M1 and M2, the image recognition unit 120 may preset information as to which of the regions M1 and M2 each pixel in an image acquired by the image capture device 11 belongs to and, based on a pixel corresponding to the position of an item, determine which of the regions M1 and M2 the item is arranged in. Alternatively, the image recognition unit 120 may determine a range based on the color of each region and determine which of the regions M1 and M2 an item is arranged in.

In the present example embodiment, the brightness of environmental light is different between the first region M1 and the second region M2. When an obstruction object is located between a light source and the recognition region A, the recognition region A is shaded, and thus the brightness varies in accordance with the position on the recognition region A. As a result, since the brightness of an image of an item acquired by the image capture device 11 varies in accordance with the position at which an item is arranged, this may affect a result of comparison with a reference image (feature amount) stored in the identification information storage unit 151. In the example of FIG. 14, the first region M1 is a bright region that is relatively bight, and the second region M2 is a dark region that is relatively dark.

For example, when an item is arranged in the first region M1, the image recognition unit 120 performs an image recognition process which is suitable for a bright state. That is, in the example FIG. 14, an image recognition process used for a bright region is performed on an item N1. When the item is arranged in the second region M2, the image recognition unit 120 performs an image recognition process which is suitable for a dark state. That is, in the example FIG. 14, an image recognition process used for a dark region is performed on an item N2.

For example, the image recognition process used for a bright region performs image recognition after correction to reduce the illuminance is performed on image data of an item, and the image recognition process used for a dark region performs image recognition after correction to increase the illuminance is performed on image data of an item. Thereby, since image recognition can be performed with the brightness being close to even, a condition of similar image recognition can be obtained regardless of the position at which an item is arranged, and accuracy in image recognition is improved. As a specific image recognition process on items in respective brightness regions, any method that is suitable for the brightness may be used without being limited to those illustrated here. While the brightness of an image is simply corrected here, the process may be significantly changed for respective regions such as using a color in an image in the image recognition process used for a bright region without using a color in the image in the image recognition process used for a dark region, for example.

In other words, the image recognition unit 120 identifies an item based on information on the position at which the item is arranged in addition to the external appearance of the item. Thereby, a suitable image recognition process can be applied to the environment in the position at which an item is arranged, and accuracy in identification can be improved.

The number of regions used by the image recognition unit 120 is not limited to two and may be any number in accordance with the type of item to be distinguished. When the brightness on the recognition region A changes as the state of a light source such as the sun, a fluorescent light, or the like changes, a range of respective regions and the process performed on respective regions may be changed in accordance with time or date.

Figure 15:
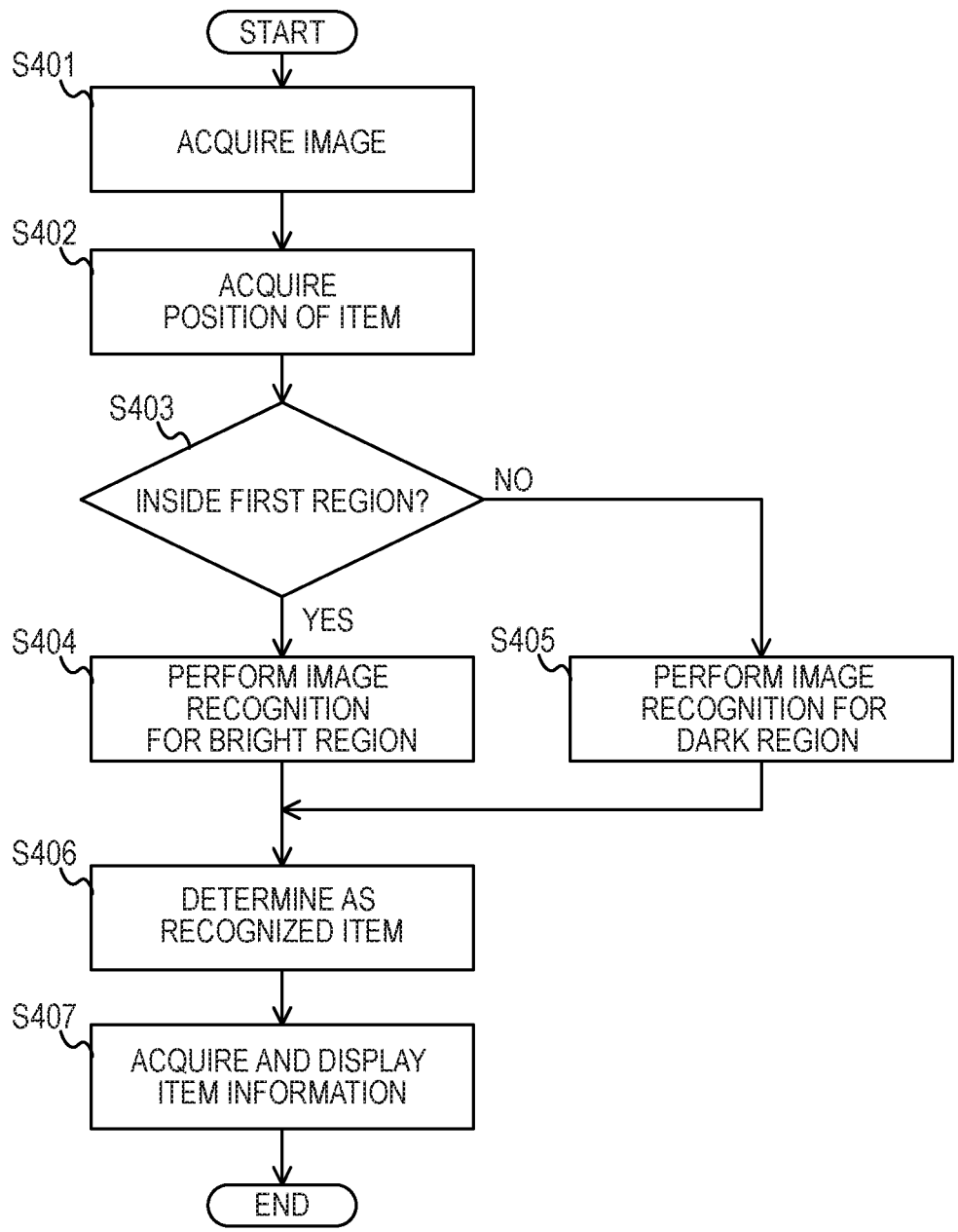
FIG. 15 is a diagram illustrating a flowchart of an image recognition method according to the fifth example embodiment.

FIG. 15 is a diagram illustrating a flowchart of an image recognition method according to the present example embodiment. The flowchart of FIG. 15 is started by the user performing a predetermined operation to execute image recognition on the image recognition system 10. For example, the flowchart of FIG. 15 is started by the user pressing a button of the input device 15 (a keyboard or a touchscreen) connected to the POS terminal 100 or at every predetermined time.

First, the image acquisition unit 110 receives a signal indicating an image captured by the image capture device 11 and inputs the received signal to the POS terminal 100 as image data (step S401).

Next, the image recognition unit 120 acquires the position of an item in the image acquired in step S401 (step S402). The following steps S403 to S407 are performed for each item detected in the image.

The image recognition unit 120 determines which of the first region M1 and the second region M2 of the recognition region A the position of an item is located in. While this determination may be performed with any method, the position of an item may be determined to be in the first region M1 when a half or more the pixels corresponding to an item is inside a region corresponding to the first region M1 in the image and, otherwise, may be determined to be in the second region M2, for example. Regions in an image corresponding to the first region M1 and the second region M2 may be preset by the user or may be set by the image recognition unit 120 performing image recognition on the color of the first region M1 and the second region M2.

If the position of the item acquired in step S402 is inside the first region M1 (step S403, YES), the image recognition unit 120 performs an image recognition process used for a bright region on the item of interest and identifies the item based on identification information in the identification information storage unit 151 (step S404).

If the position of the item acquired in step S402 is inside the second region M2 (step S403, NO), the image recognition unit 120 performs an image recognition process used for a dark region on the item of interest and identifies the item based on identification information in the identification information storage unit 151 (step S405).

The image recognition unit 120 then determines the item identified in step S404 or S405 as the item in the image (step S406).

Finally, the item information acquisition unit 130 acquires item information from the item information storage unit 152 based on the item ID of the item determined in step S406, and the display control unit 140 performs control to display item information by using the display device 13 (step S407).

The CPU 101 of the POS terminal 100 is the subject of each step (process) included in the image recognition method illustrated in FIG. 15. That is, the CPU 101 performs the image recognition method illustrated in FIG. 15 by reading a program to perform the image recognition method illustrated in FIG. 15 from the memory 102 or the storage device 103 and executing the program to control each unit of the POS terminal 100.

The image recognition system 10 according to the present example embodiment performs image recognition on an item by using the position at which an item is arranged in addition to an external appearance of an item in the same manner as the third example embodiment. Thereby, an image recognition process which is suitable for the environment for the position at which an item is arranged can be performed, and therefore accuracy in image recognition can be improved.

Sixth Example Embodiment

The present example embodiment distinguishes similar items having different sizes by further performing a size determination process using a reference line in the image recognition system 10 according to any one of the first to fifth example embodiments.

Figure 16:
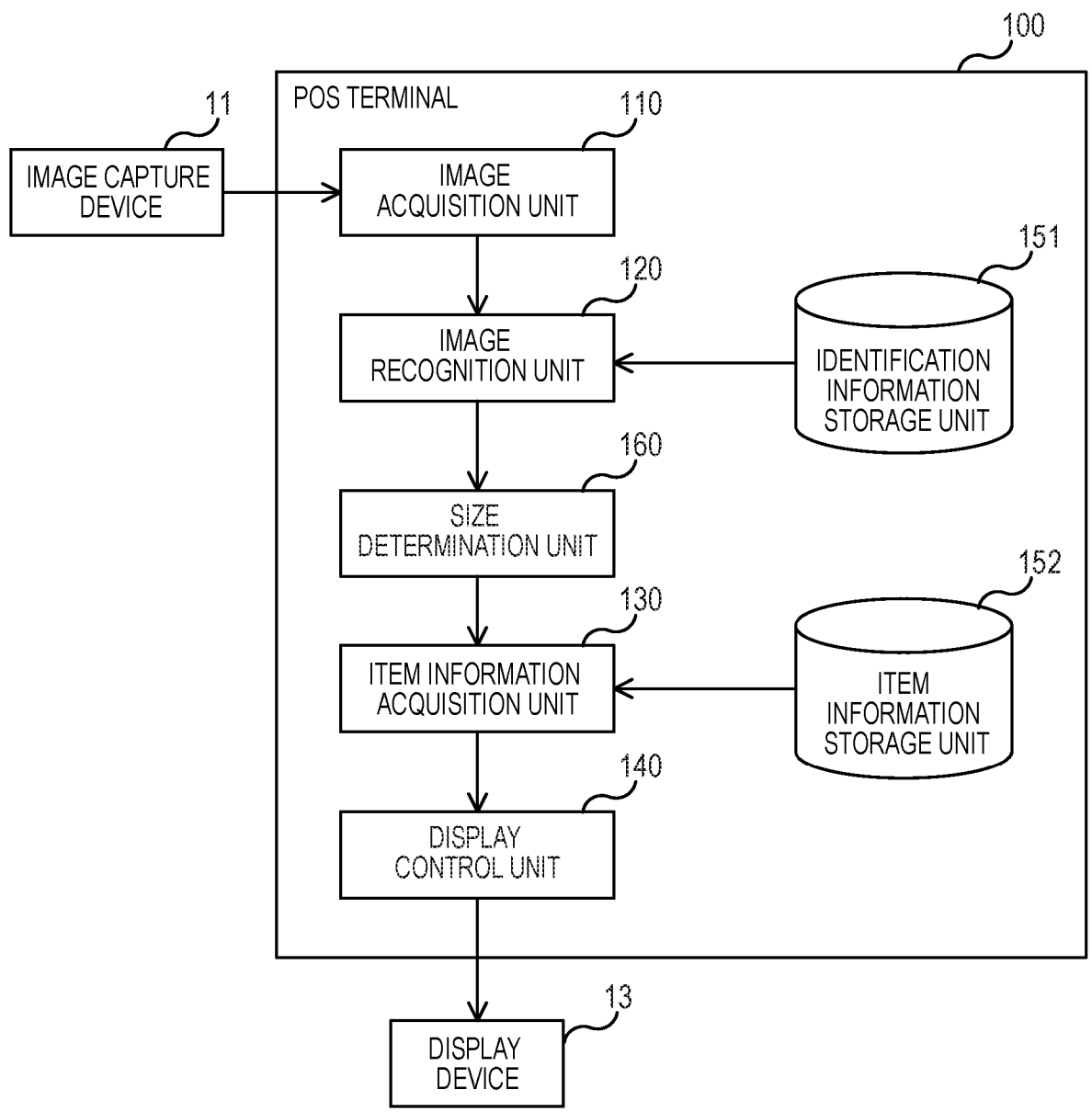
FIG. 16 is a block diagram of a POS terminal according to a sixth example embodiment.

FIG. 16 is a block diagram of the POS terminal 100 (image recognition apparatus) according to the present example embodiment. In FIG. 16, arrows represent main flows of data, and there may be other flows of data than those illustrated in FIG. 16. In FIG. 16, each block illustrates a configuration in a unit of function rather than in a unit of hardware (device). Therefore, the block illustrated in FIG. 16 may be implemented in a single device or may be implemented independently in a plurality of devices. Data exchange between blocks may be performed via any component, such as a data bus, a network, a portable storage medium, or the like.

The POS terminal 100 according to the present example embodiment has a size determination unit 160 as a processing unit in addition to the image acquisition unit 110, the image recognition unit 120, the item information acquisition unit 130, and the display control unit 140 illustrated in FIG. 5.

The image recognition unit 120 (also referred to as an extraction unit) extracts each item included in an image acquired by the image acquisition unit 110 and outputs an extraction result together with a range in the image of each extracted item. For example, in the identification information storage unit 151, feature amounts calculated in advance from reference images of various items are stored as identification information in association with item IDs that identify respective items. As a feature amount, any information indicating external appearance of an item may be used that can be calculated from image data, such as a shape, a color, a color distribution, or the like. The image recognition unit 120 calculates a feature amount from image data acquired by the image acquisition unit 110 and compares the calculated feature amount with a feature amount stored in the identification information storage unit 151. The image recognition unit 120 then identifies, as the item in the image, an item having most similar feature amount (that is, satisfying a predetermined criterion) in the identification information storage unit 151. The image recognition unit 120 acquires and outputs an item ID, which is an identifier of the identified item, from the identification information storage unit 151. Further, the image recognition unit 120 outputs a range of the identified item (for example, coordinates of a left-upper point and a right-under point of a region from which a feature amount is calculated). As an item recognition method performed by the image recognition unit 120, any image recognition technology that can identify an item from image data may be used without being limited to the specific method illustrated here.

The size determination unit 160 (also referred to as a determination unit) determines whether or not the size of the item determined by the image recognition unit 120 is close to the size of an item in an image and finally determines an item, accordingly. A specific size determination process will be described later by using FIG. 19A to FIG. 19C.

In the present example embodiment, the CPU 101 functions as the image acquisition unit 110, the image recognition unit 120, the item information acquisition unit 130, the display control unit 140, and the size determination unit 160 of FIG. 16 by executing a program stored in the storage device 103.

In the image recognition process according to the present example embodiment, the image recognition unit 120 superimposes an outer edge of a pre-stored item image on an item in an image and identifies an item based on a difference between a predetermined reference line and the outer edge. Thereby, even with items of variation having different sizes, an item having a size close to an item in an image can be selectively identified.

In the present example embodiment, for items D1 and D2 having similar external appearance as illustrated in FIG. 9, accuracy in image recognition is improved by facilitating differentiation of size by using the difference from reference lines (reference coordinates) on which the items D1 and D2 are arranged.

Figure 17:
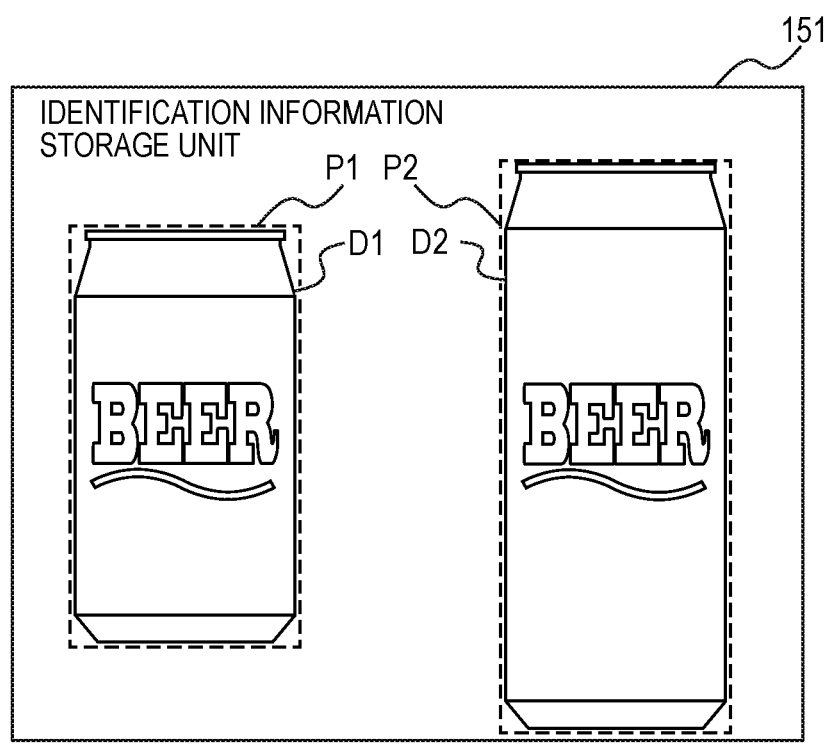
FIG. 17 is a schematic diagram illustrating identification information on items stored in an identification information storage unit in the sixth example embodiment.

FIG. 17 is a schematic diagram illustrating identification information on the items D1 and D2 stored in the identification information storage unit 151 in the present example embodiment. In the identification information storage unit 151, ranges (for example, respective coordinates of a left-upper point and a right-under point) of outer edges P1 and P2 that are rectangular regions surrounding the outer edges of the item images of the items D1 and D2, respectively, in addition to the item IDs of the items D1 and D2 or feature amounts calculated from images of the items D1 and D2 are stored as identification information on the items D1 and D2. The outer edges P1 and P2 may be automatically detected by detecting external shapes of the items D1 and D2 or may be set by the user. While the images themselves of respective items D1 and D2 are illustrated for better visibility in FIG. 17, information indicating the feature amounts calculated from the items D1 and D2 and the ranges of the outer edges P1 and P2 of the items D1 and D2 can be stored in the identification information storage unit 151 in any form of character strings, binary data, or the like.

Figure 18:
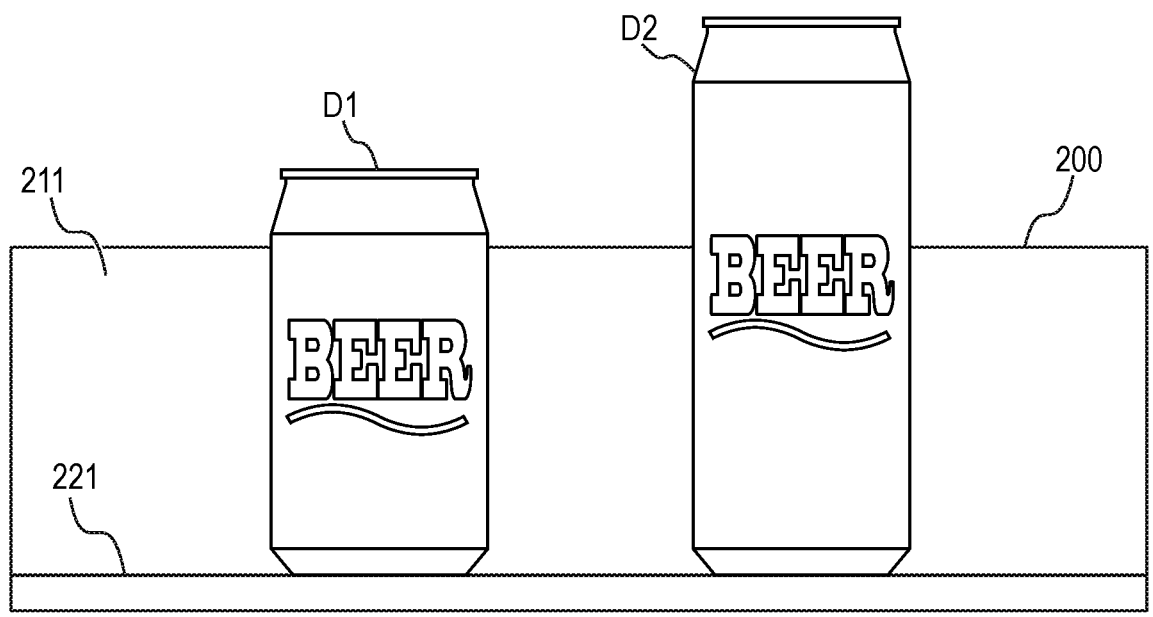
FIG. 18 is a top view of a support portion in a state where items are arranged according to the first example embodiment.

FIG. 18 is a top view of the support portion 200 in a state where items are arranged. FIG. 18 is a diagram when the support portion 200 supporting the items D1 and D2 is viewed from a direction perpendicular to the side face support face 211. Since the side face support face 211 supports the side faces of the items D1 and D2 and the bottom face support face 221 supports the bottom faces of the items D1 and D2 as illustrated in FIG. 18, the support portion 200 can support the bottom faces of the items D1 and D2 at the same level on the bottom face support face 221 and facilitate capturing of the side faces of the items D1 and D2 by the image capture device 11.

Figure 19A:
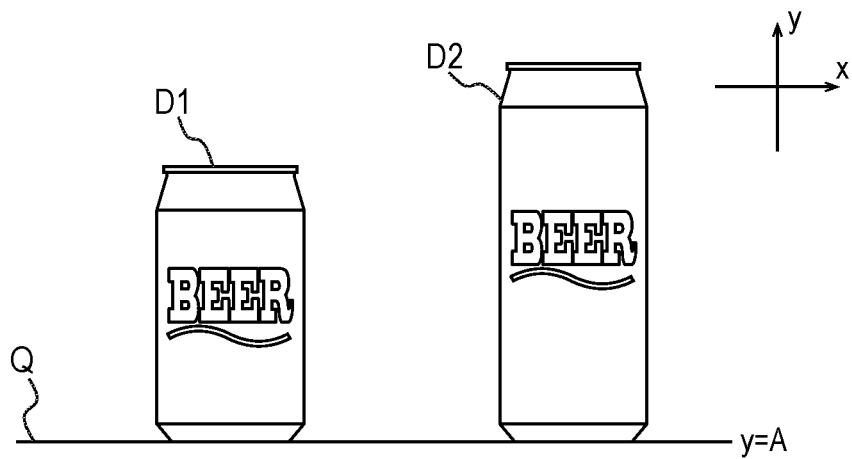
FIG. 19A is a schematic diagram of a size determination process performed by an image recognition system according to the sixth example embodiment.
Figure 19B:
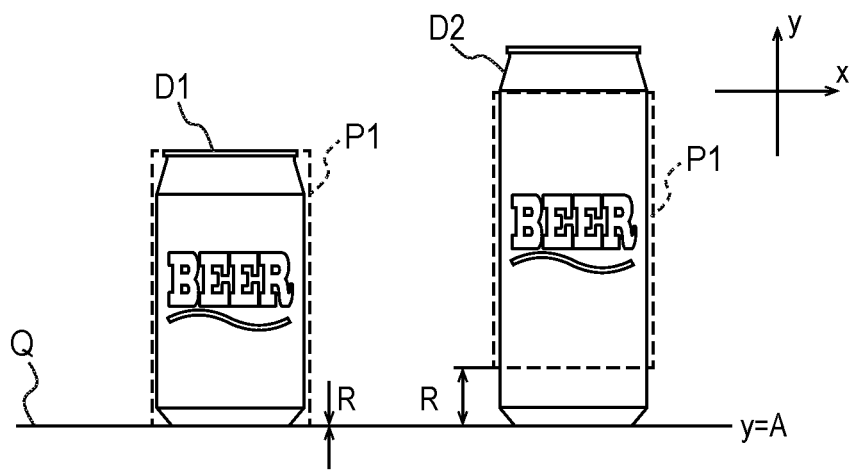
FIG. 19B is a schematic diagram of a size determination process performed by the image recognition system according to the sixth example embodiment.
Figure 19C:
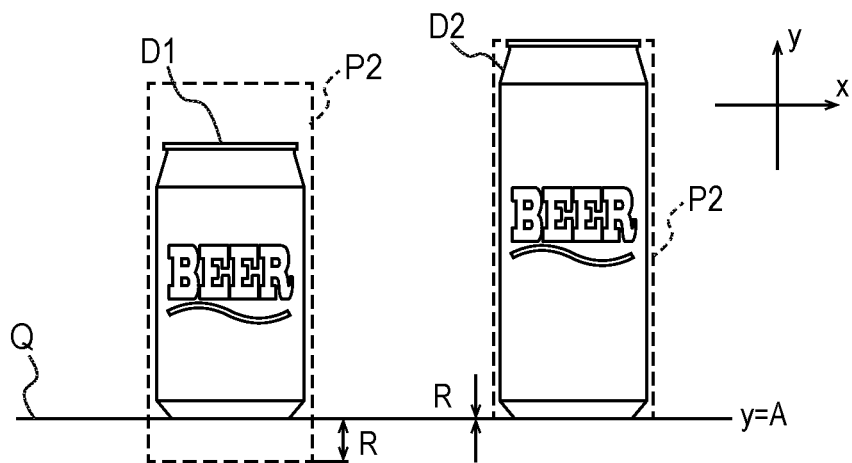
FIG. 19C is a schematic diagram of a size determination process performed by the image recognition system according to the sixth example embodiment.

FIG. 19A to FIG. 19C are schematic diagrams of the size determination process performed by the image recognition system 10 according to the present example embodiment. While each of FIG. 19A to FIG. 19C illustrates the x-axis and the y-axis, any x-axis and y-axis can be employed. Since the items D1 and D2 in the image are similar to each other here, the items D1 and D2 may be determined as the item D1 or D2 in any way by a conventional image recognition process. The size determination process according to the present example embodiment accurately uses reference lines (reference coordinates) to identify which of the similar items D1 and D2 having different sizes from each other the items D1 and D2 in an image correspond to. While the case where the number of types of items is two is illustrated here, the number of types may be any number of at least two or more.

In FIG. 19A to FIG. 19C, a reference line Q (that is, a set of reference coordinates) used as a reference of size determination is illustrated in addition to the items D1 and D2 in an image acquired by the image capture device 11. The reference line Q may be reference coordinates (reference point) expressed by an equation $y=A$ (A is a constant), for example. Since the items D1 and D2 are supported by the support portion 200, predetermined faces (bottom faces in this example) of the items D1 and D2 are naturally matched on the bottom face support face 221. Thus, in the present example embodiment, the position of the bottom face support face 221 is defined as the reference line Q, and the bottom face of each item is located on the reference line Q. The predetermined face to be located on the reference line Q may be any face in accordance with the shape of an item without being limited to the bottom face.

First, as illustrated in FIG. 19A, the size determination unit 160 acquires the positions of the items D1 and D2 and the position of the reference line Q in the image acquired by the image capture device 11. The size determination unit 160 receives, from the image recognition unit 120, the positions of the items D1 and D2 extracted by the image recognition unit 120. The position of the reference line Q in the image acquired in the image capture device 11 may be preset by the user and stored in a storage device. In such a case, the size determination unit 160 reads coordinates of a particular pixel in the image acquired by the image capture device 11 as the position of the reference line Q from the storage device, for example. Alternatively, the position of the reference line Q in the image acquired by the image capture device 11 may be set by the image recognition unit 120 performing image recognition on the support portion 200 (the bottom face support face 221). In such a case, the size determination unit 160 receives, from the image recognition unit 120, the position of the bottom face support face 221 determined by the image recognition unit 120 based on the external appearance such as the shape, the color, the pattern, or the like of the support portion 200 as the position of the reference line Q, for example.

Firstly, a case where the item D1 is extracted by the image recognition unit 120 for both the items D1 and D2 will be described. The size determination unit 160 receives a range of the outer edge P1 corresponding to the extracted item D1 from the image recognition unit 120. The size determination unit 160 then superimposes the outer edge P1 of the item D1 on the items D1 and D2 in the image, as illustrated in FIG. 19B. The range of the outer edge P1 and the ranges of the items D1 and D2 in the image are expressed by the coordinates (an x-coordinate and a y-coordinate) of the left-under point and the right-under point of respective regions, for example. Then, the outer edge P1 and the items D1 and D2 are superimposed so that the orientation and the center point (centroid) of the range of the outer edge P1 match the orientation and the center point (centroid) of the range of the items D1 and D2 in the image. This state is illustrated in FIG. 19B. The size determination unit 160 calculates the distance between the reference line Q and the outer edge P1 for each item in the image as a difference R. When the difference R is within a predetermined range (when the outer edge P1 of the item D1 is superimposed on the item D1 in the image in this example), the image recognition unit 120 employs the extracted item D1, and when the difference R is not within the predetermined range (when the outer edge P1 of the item D1 is superimposed on the item D2 in the image in this example), discards the extracted item D2. The predetermined range of the difference R is preset by the user.

Secondly, a case where the item D2 is extracted by the image recognition unit 120 for both the items D1 and D2 will be described. The size determination unit 160 receives a range of the outer edge P2 corresponding to the extracted item D2 from the image recognition unit 120. The size determination unit 160 then superimposes the outer edge P2 of the item D2 on the items D1 and D2 in the image, as illustrated in FIG. 19C. The range of the outer edge P2 and the ranges of the items D1 and D2 in the image are expressed by the coordinates (an x-coordinate and a y-coordinate) of the left-under point and the right-under point of respective regions, for example. Then, the outer edge P2 and the items D1 and D2 are superimposed so that the orientation and the center point (centroid) of the range of the outer edge P2 match the orientation and the center point (centroid) of the range of the items D1 and D2 in the image. This state is illustrated in FIG. 19C. The size determination unit 160 calculates the distance between the reference line Q and the outer edge P2 for each item in the image as a difference R. When the difference R is within a predetermined range (when the outer edge P2 of the item D2 is superimposed on the item D2 in the image in this example), the image recognition unit 120 employs the extracted item D2, and when the difference R is not within the predetermined range (when the outer edge P2 of the item D2 is superimposed on the item D1 in the image in this example), discards the extracted item D1. The predetermined range of the difference R is preset by the user.

While the distance between the reference line Q and the outer edge (that is, the point of the outer edge which is the closest to the reference line Q) is used here as the difference R, other values representing a relative positional relationship between the reference line Q and the outer edge may be used. For example, the midpoint of any of the sides of the outer edge may be defined as a reference point on the outer edge, and the distance between the reference point and the reference line Q may be used as the difference R. Alternatively, the midpoint of each of the sides of the outer edge may be defined as each reference point on the outer edge, and a plurality of distances between respective reference points and the reference line Q may be used as the difference R. Alternatively, the bottom side of the outer edge may be determined by detecting the orientation of an item, a particular point on the bottom side (for example, the endpoint or the midpoint) may be defined as a reference point on the outer edge, and the distance between the reference point and the reference line Q may be used as the difference R.

As described above, the size determination unit 160 according to the present example embodiment can calculate the difference between the outer edge of an item and a reference line, identify the size being a size close to the item in the image when the difference is within a predetermined range, and accurately determine the item. Further, since the support portion 200 supports items, the position of the items (the bottom face of the items) can be easily matched to the reference line.

Figure 20:
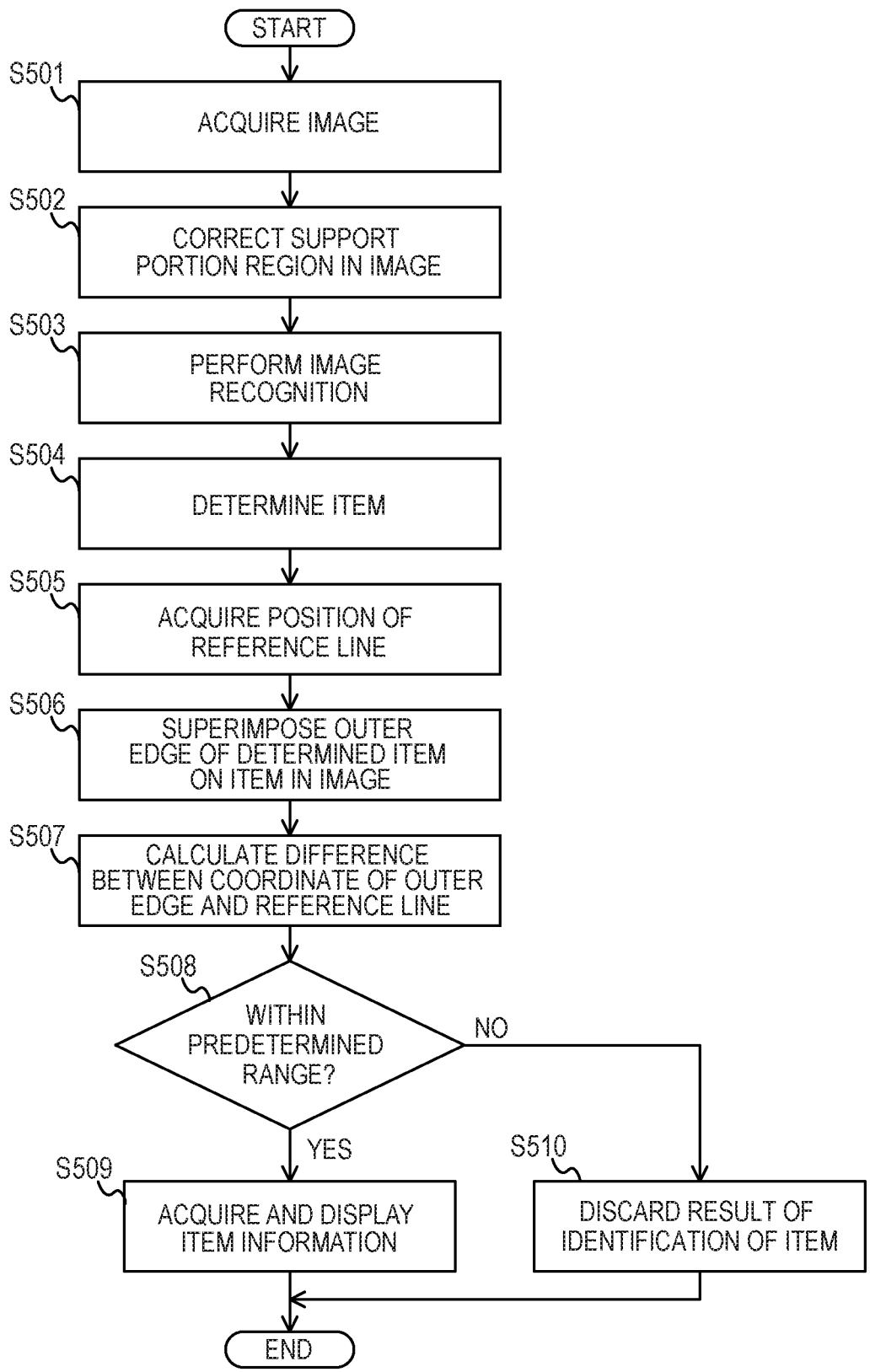
FIG. 20 is a diagram illustrating a flowchart of an image recognition method according to the sixth example embodiment.

FIG. 20 is a diagram illustrating a flowchart of the image recognition method according to the present example embodiment. The flowchart of FIG. 20 is started by the user performing a predetermined operation to execute image recognition on the image recognition system 10 or at every predetermined time. For example, the flowchart of FIG. 20 is started by the user pressing a button of the input device 15 (a keyboard or a touchscreen) connected to the POS terminal 100.

First, the image acquisition unit 110 receives a signal indicating an image captured by the image capture device 11 and inputs the received signal to the POS terminal 100 as image data (step S501).

Next, the image recognition unit 120 performs correction on a region corresponding to the support portion 200 (support portion region) in the image acquired in step S501 by using the angle C1 of the support portion 200 and the positional relationship between the image capture device 11 and the support portion 200 and outputs the corrected region as one image data (step S502). The support portion region is preset as a position in an image (for example, coordinates of a pixel). Further, a position of the support portion 200 may be determined from an image by image recognition to use the position as the support portion region.

The image recognition unit 120 performs an image recognition process on an item by using the image data corrected in step S502 and identifies an item based on identification information in the identification information storage unit 151 (step S503). The image recognition unit 120 then determines the item identified in step S503 as the item in the image (step S504). When a plurality of items are identified in one image data, the subsequent process is performed on each item.

Next, the size determination unit 160 acquires the position of the reference line Q from the image acquired in step S501 (step S505). A predetermined face (for example, the bottom face) of the item is located on the reference line Q. For example, the position of the reference line Q in the image is acquired by reading the content preset by the user or by performing image recognition on the image acquired in step S501.

Next, the size determination unit 160 receives, from the image recognition unit 120, information indicating the range of an item in the image and the range of the outer edge of the item determined in step S504 and superimposes the outer edge of the item determined in step S504 on the item in the image (step S506). At this time, the outer edge of the item determined in step S504 is superimposed on the item in the image so that the orientation and the center point (centroid) of the range of the outer edge match the orientation and the center point (centroid) of the range of the item. The outer edge of an item is pre-stored in the identification information storage unit 151, for example. Note that the outer edge of an item may be an outer edge of a pre-registered item image, or an outer edge itself of a pre-registered item (that is, a set of points or lines representing an outer edge) may be stored.

Next, the size determination unit 160 calculates the distance between a reference point on the outer edge superimposed on the item and the reference line Q as the difference R (step S507). For example, a point on the outer edge which is the closest to the reference line Q may be defined as a reference point of the outer edge, and the distance between the reference point and the reference line Q may be used as the difference R. Alternatively, the midpoint of any of the sides of the outer edge may be defined as a reference point on the outer edge, and the distance between the reference point and the reference line Q may be used as the difference R. Alternatively, the midpoint of each of the sides of the outer edge may be defined as each reference point on the outer edge, and a plurality of distances between respective reference points and the reference line Q may be used as the difference R. Alternatively, the bottom side of the outer edge may be determined by detecting the orientation of an item, a particular point on the bottom side (for example, the endpoint or the midpoint) may be defined as a reference point on the outer edge, and the distance between the reference point and the reference line Q may be used as the difference R.

If the difference R calculated in step S507 is within a predetermined range (step S508, YES), the item information acquisition unit 130 acquires item information from the item information storage unit 152 based on the item ID of the item determined in step S504, and the display control unit 140 performs control to display item information by using the display device 13 (step S509).

If the difference R calculated in step S507 is not within a predetermined range (step S508, NO), the item information acquisition unit 130 discards the result of identification of the item determined in step S504 (step S510).

In particular, when the flowchart of FIG. 20 is performed at every predetermined time, item information may be repeatedly acquired on the same item left placed on the placement stage 14, and the price of the same item may be collected for multiple times in payment. Accordingly, when the image recognition unit 120 identifies the same item at close positions within a predetermined time period or a predetermined number of frames (for example, the difference in positions of centroids is below a predetermined value), the item information acquisition unit 130 does not perform acquisition of item information on the item in step S509 (not illustrated in the flowchart of FIG. 20).

While an item is temporarily determined in step S504 and a result of identification of the item is discarded in step S510 if the difference from the reference line is out of a predetermined range in the flowchart of FIG. 20, the process is not limited to this specific form. For example, a plurality of candidates of items similar to an item in an image may be extracted in step S504, and, out of the plurality of candidates, a candidate whose difference from the reference line satisfies a predetermined criterion (for example, the difference is the smallest) may be determined as the item in the image.

The CPU 101 of the POS terminal 100 is the subject of each step (process) included in the image recognition method illustrated in FIG. 20. That is, the CPU 101 performs the image recognition method illustrated in FIG. 20 by reading a program to perform the image recognition method illustrated in FIG. 20 from the memory 102 or the storage device 103 and executing the program to control each unit of the POS terminal 100.

The image recognition system 10 according to the present example embodiment identifies an image by using a positional difference between the outer edge of an item and a reference line (reference coordinates) in addition to an external appearance of an item. Thereby, even when there are multiple similar items with different sizes, an item having a size close to an item in an image can be determined, and therefore accuracy in image recognition can be improved.

Further, while the present example embodiment is based on the condition that the bottom faces of items are matched to the reference line, since the support portion 200 supports items and the reference line corresponds to the bottom face support face 221, the items (the bottom faces of the items) can be easily matched to the reference line.

Seventh Example Embodiment

While the positions of items are matched to the reference line Q by using the support portion 200 in the sixth example embodiment, the positions of items are matched to the reference line Q represented on the placement stage 14 by the user in the present example embodiment. The present example embodiment uses the image recognition system 10 having the same configuration as that of the sixth example embodiment. The present example embodiment may be used instead of any one of the first to sixth example embodiments or may be used in combination with any one of the first to sixth example embodiments.

Figure 21:
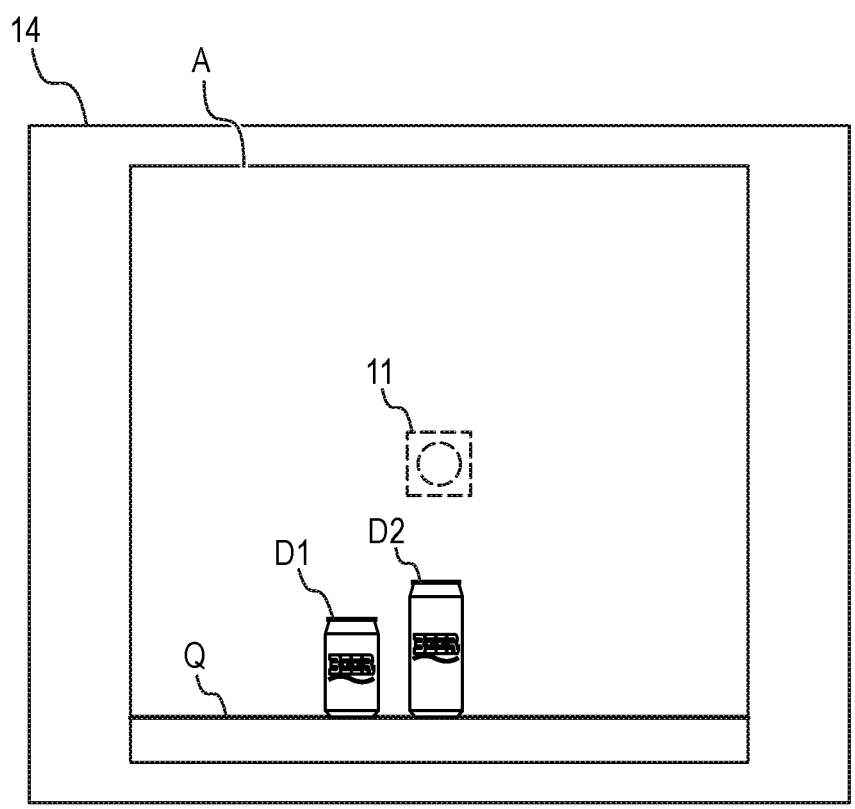
FIG. 21 is a top view of a recognition region on a placement stage according to a seventh example embodiment.

FIG. 21 is a top view of the recognition region A on the placement stage 14 according to the present example embodiment. In FIG. 21, a position at which the image capture device 11 is projected on the placement stage 14 is illustrated by a dashed line. The reference line Q used as a reference in size determination is expressed inside the recognition region A. The reference line Q is represented by any method that can be visually indicated to the user and, for example, may be represented by structure such as a protrusion or a recess provided on or in the placement stage 14, a symbol or a color represented on the placement stage 14, or light projected by the projection device 12.

The position of the reference line Q in the image acquired by the image capture device 11 may be preset by the user or may be set by the image recognition unit 120 performing image recognition on the reference line Q within the recognition region A.

Before image recognition is performed, the user may arrange the items D1 and D2 that may have variation of different sizes, such as beverage cans, such that the bottom faces thereof match the reference line Q. Note that, for an item having no variation, the user may arrange such an item in any region on the recognition region A.

Next, the user performs an operation for performing the image recognition method on the image recognition system 10. The image recognition system 10 performs image recognition on the items D1 and D2 arranged on the placement stage 14 in accordance with the image recognition method illustrated in the flowchart of FIG. 20. The image recognition system 10 then determines the size based on the reference line Q represented inside the recognition region A.

Then, the image recognition system 10 displays, on the display device 13, item information on the item identified by the image recognition.

In the present example embodiment, although it takes labor to arrange an item to be matched to the reference line Q by the user's hand unlike the first example embodiment, an item having a size close to an item in an image can be selectively identified even when there are multiple similar items with different sizes, and therefore accuracy in image recognition can be improved.

Eighth Example Embodiment

While the sixth and seventh example embodiments have targeted image recognition of an item at payment in a POS terminal, the present example embodiment targets image recognition of an item placed on a shelf. Features different from those of the sixth example embodiment will be mainly described below.

Figure 22:
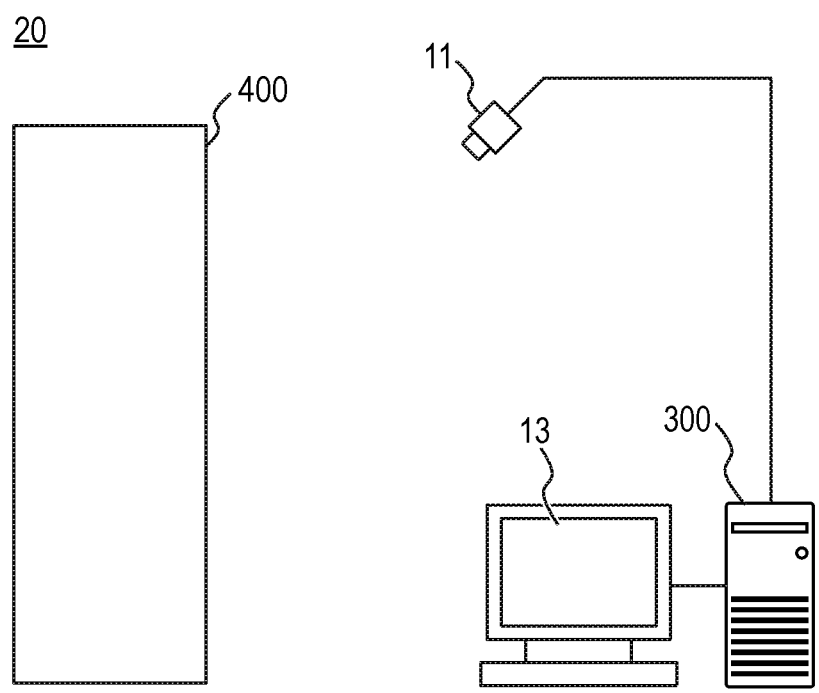
FIG. 22 is a schematic diagram of an image recognition system according to an eighth example embodiment.

FIG. 22 is a schematic diagram of an image recognition system 20 according to the present example embodiment. The image recognition system 20 has an image recognition apparatus 300 and a shelf 400 on which an item that is a target of image recognition is arranged. The image recognition apparatus 300 is connected to the image capture device 11 provided at a position from which an item on the shelf 400 can be captured and to the display device 13 that displays information related to the item. The configurations of the image capture device 11 and the display device 13 are the same as those of the sixth example embodiment. While omitted in the sixth example embodiment, the projection device 12 may be provided.

While the POS terminal 100 is the image recognition apparatus in the sixth example embodiment, a general computer is used as the image recognition apparatus 300 in the present example embodiment. As with the sixth example embodiment, the image recognition apparatus 300 may be configured integrally with another apparatus such as a POS terminal.

The device configuration of the image recognition apparatus 300 is the same as the device configuration of the POS terminal 100 illustrated in FIG. 6. The image recognition apparatus 300 identifies the item on the shelf 400 by an image recognition method and displays, on the display device 13, information regarding the arrangement of one or more items on the shelf 400. For example, the information regarding the arrangement of one or more items may be information on the number and the position of arranged particular items, information as to whether or not the arrangement of one or more items satisfies a referenced display condition, or the like.

The image capture device 11 is provided at a position so as to be able to capture the front face of the shelf 400 and is fixed to a pillar, an arm, a ceiling, or the like (not illustrated). To perform image recognition of a wide area of the shelf 400 by the single image capture device 11, it is desirable that the image capture device 11 be movable and be able to capture different regions on the shelf 400. The image capture device 11 is able to capture a region including at least the front face of the shelf 400 and transmits a signal indicating a captured image to the image recognition apparatus 300. The signal indicating an image captured by the image capture device 11 may be directly transmitted to the image recognition apparatus 300, or may once be stored in a storage device and then read by the image recognition apparatus 300. The image capture device 11 may perform capturing at predetermined time intervals or may perform capturing in accordance with an instruction from the image recognition apparatus 300.

Figure 23:
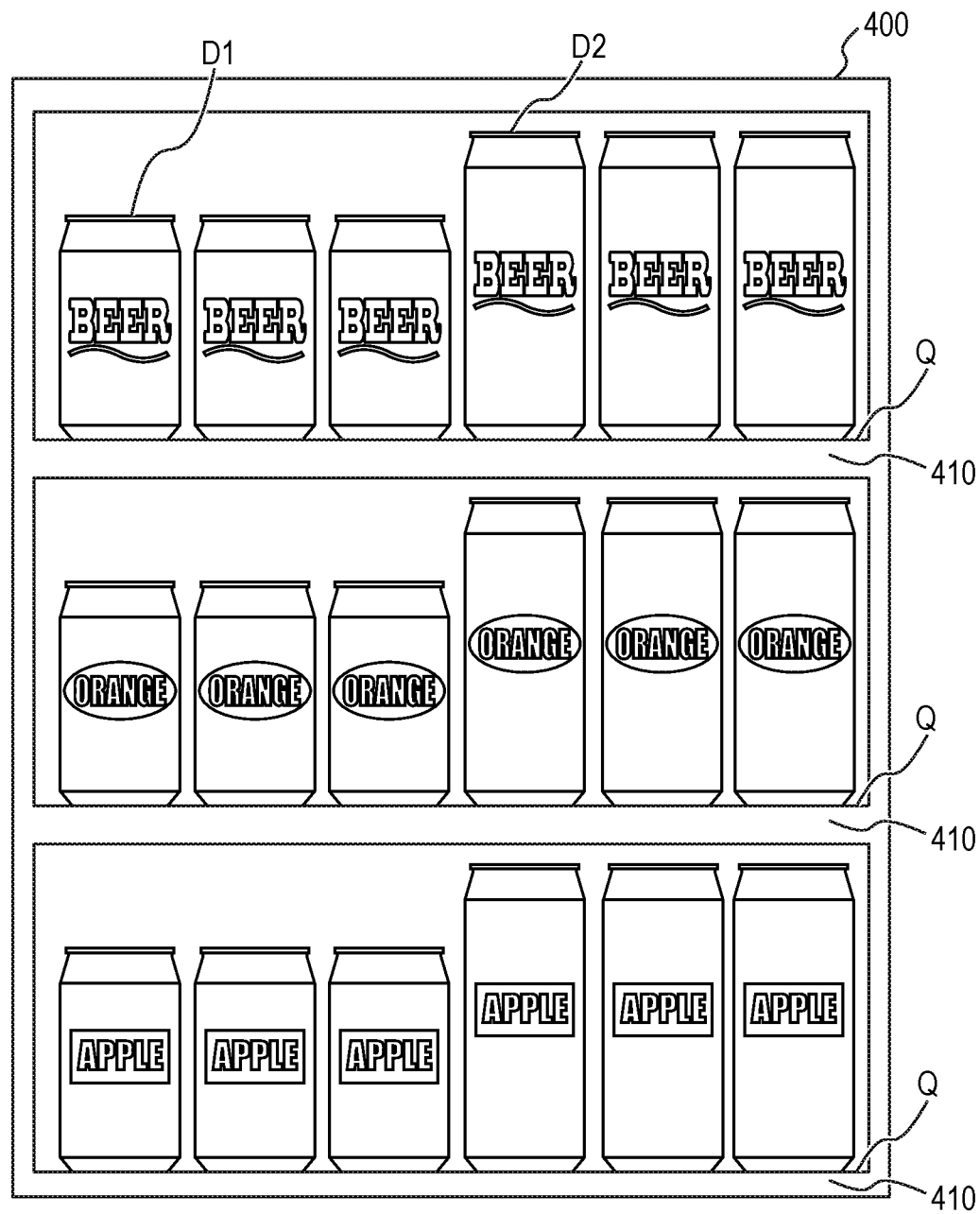
FIG. 23 is a front view of a shelf a according to the eighth example embodiment.

FIG. 23 is a front view of the shelf 400 according to the present example embodiment. The shelf 400 has at least one shelf plate 410 extending in the horizontal direction (that is, a direction perpendicular to the gravity direction). The items D1 and D2 are placed on the shelf plate 410. When the arrangement of the items D1 and D2 can be captured by the image capture device 11, a transparent door may be provided on the front face side of the shelf 400.

In the present example embodiment, the top face of the shelf plate 410 corresponds to the reference line Q used as a reference in size determination. Thus, predetermined faces (the bottom faces here) of the items D1 and D2 arranged on the shelf 400 naturally match the reference line Q.

The position of the reference line Q in the image acquired by the image capture device 11 may be preset by the user or set by the image recognition unit 120 performing image recognition on the shelf plate 410.

When image recognition is performed, the user performs an operation for performing an image recognition method on the image recognition system 20. The image recognition system 20 performs image recognition on the items D1 and D2 arranged on the shelf 400 in accordance with the image recognition method illustrated in the flowchart of FIG. 20.

The image recognition system 10 then determines the size based on the reference line Q (that is, the top face of the shelf plate 410).

Then, the image recognition system 20 uses item information on the item identified by image recognition to display, on the display device 13, information regarding the arrangement of the item on the shelf 400.

The image recognition system 20 according to the present example embodiment performs image recognition on an item arranged on a shelf instead of an item at payment and outputs information regarding the arrangement of the item. At this time, even when a plurality of similar items having different sizes are present, since an item having a size close to an item in an image can be selectively identified, accuracy in image recognition can be improved. Further, since the top face of a shelf plate on which items are arranged is used as a reference line of size determination, items (bottom faces of items) can be easily matched to the reference line.

Other Example Embodiments

Figure 24:
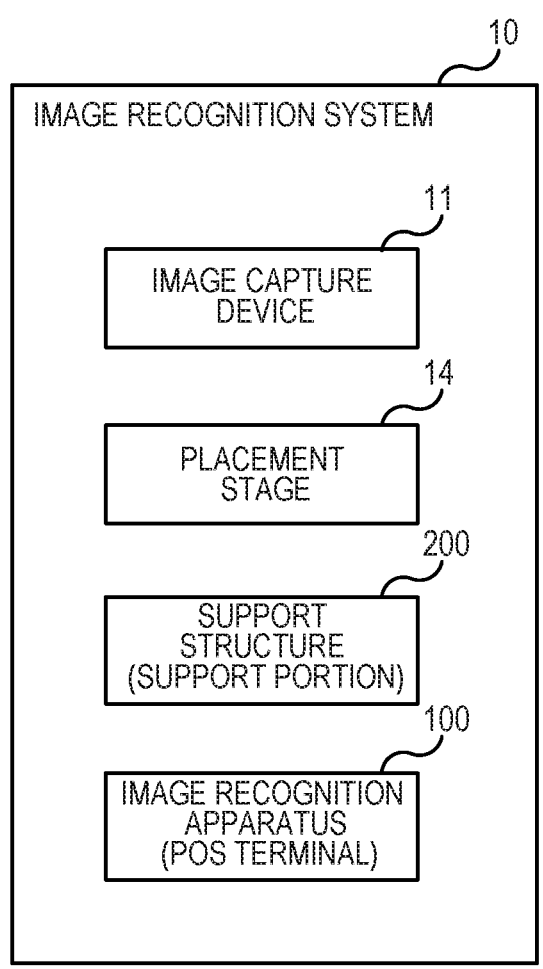
FIG. 24 is a general configuration diagram of the image recognition system according to each example embodiment.

FIG. 24 is a general configuration diagram of the image recognition system 10 according to each of the example embodiments described above. FIG. 24 illustrates a configuration example by which the image recognition system 10 performs image recognition on the side face of an item. The image recognition system 10 has a placement stage 14 used for placing an item below an image capture device provided so as to perform capturing of a downward direction, the support structure (support portion) 200 configured to support the item at a predetermined angle relative to the top face of the placement stage, and an image recognition apparatus (POS terminal) 100 that identifies the item by performing image recognition on an image of the item acquired by the image capture device.

Figure 25:
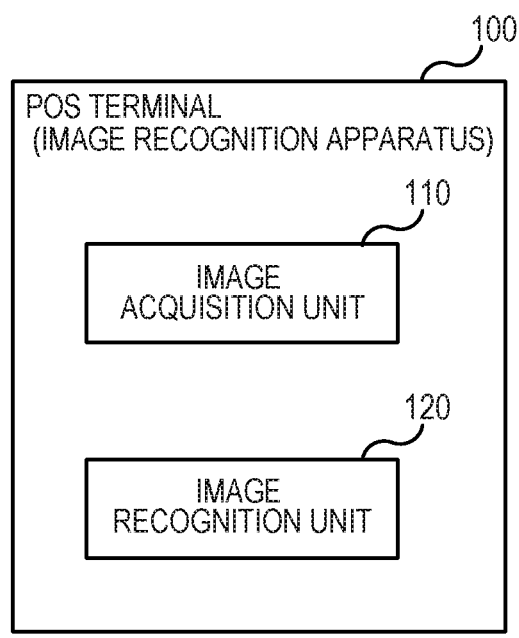
FIG. 25 is a general configuration diagram of the POS terminal according to each example embodiment.

FIG. 25 is a general configuration diagram of the POS terminal 100 according to each of the example embodiments described above. FIG. 25 illustrates a configuration example by which the POS terminal 100 functions as an image recognition apparatus that performs image recognition by using information on the position of an item. The POS terminal 100 has the image acquisition unit 110 that acquires an image of an item arranged in a recognition region and the image recognition unit 120 that identifies the item based on external appearance of the item and the position of the item in the recognition region in the acquired image.

Figure 26:
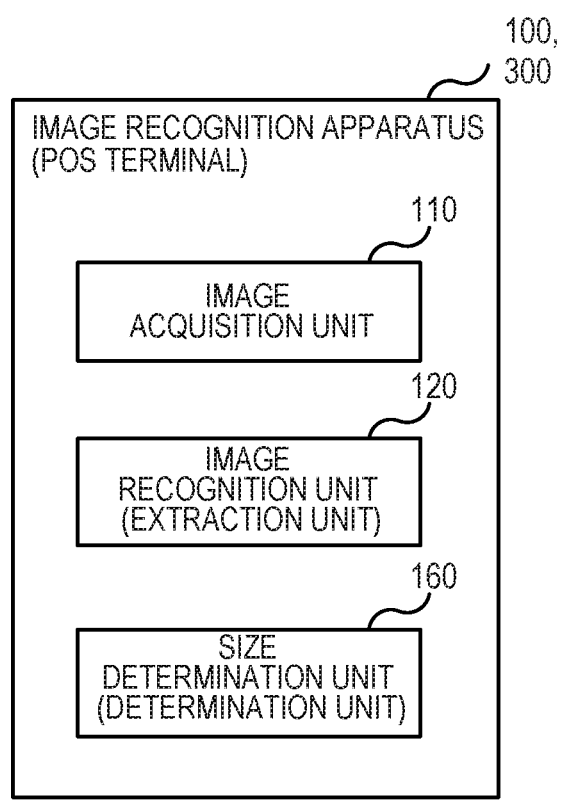
FIG. 26 is a general configuration diagram of the image recognition apparatus according to each example embodiment.

FIG. 26 is a general configuration diagram of an image recognition apparatus according to each of the example embodiments described above. FIG. 26 illustrates a configuration example by which the image recognition apparatus (that is, the POS terminal 100 or the image recognition apparatus 300) functions as an apparatus that performs image recognition on an item by using information on a reference coordinate. Each of the image recognition apparatuses (POS terminals) 100 and 300 has the image acquisition unit 110 that acquires an image of an item arranged such that a predetermined face is located at a reference coordinate, the image recognition unit (extraction unit) 120 that extracts an item corresponding to the item in the acquired image based on external appearance of the item in the acquired image, and the size determination unit (determination unit) 160 that superimposes an outer edge of the extracted item on the item in the acquired image, calculates a difference between the outer edge and the reference coordinate, and determines the item in the acquired image based on the difference.

The present invention is not limited to the example embodiments described above and can be properly changed within the scope not departing from the spirit of the present invention.

Further, the scope of each of the example embodiments includes a processing method that stores, in a storage medium, a program that causes the configuration of each of the example embodiments to operate so as to implement the function of each of the example embodiments described above (for example, a program that causes the POS terminal 100 to perform the process illustrated in FIG. 7, FIG. 11, FIG. 13, FIG. 15, and FIG. 20), reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a CD-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An image recognition system comprising:

a placement stage used for placing an item below an image capture device provided so as to perform capturing of a downward direction;

a support structure configured to support the item at a predetermined angle relative to a top face of the placement stage; and an image recognition apparatus that identifies the item by performing image recognition on an image of the item acquired by the image capture device.

(Supplementary note 2)

The image recognition system according to supplementary note 1, wherein the image recognition apparatus is configured to perform the image recognition that is different for the item directly placed on the placement stage and for the item supported by the support structure.

(Supplementary note 3)

The image recognition system according to supplementary note 1 or 2, wherein the image recognition apparatus is configured to perform the image recognition on a predetermined recognition region on the placement stage, and wherein the support structure is provided in contact with an end of the recognition region or near the end of the recognition region.

(Supplementary note 4)

The image recognition system according to supplementary note 3, wherein the support structure is provided at a position closer to the end of the recognition region than to a midpoint of a line between a point at which an optical axis of the image capture device intersects the recognition region and the end of the recognition region.

(Supplementary note 5)

The image recognition system according to supplementary note 3 or 4 further comprising a projection device that projects the recognition region.

(Supplementary note 6)

The image recognition system according to any one of supplementary notes 1 to 5, wherein the support structure has a side face support face forming the angle relative to a top face of the placement stage.

(Supplementary note 7)

The image recognition system according to supplementary note 6, wherein the support structure has a bottom face support face perpendicular to the side face support face.

(Supplementary note 8) The image recognition system according to any one of supplementary notes 1 to 7, wherein the angle is greater than 0 degree and less than 90 degrees.

(Supplementary note 9)

The image recognition system according to supplementary note 8, wherein the angle is greater than or equal to 30 degrees and less than or equal to 60 degrees.

(Supplementary note 10)

The image recognition system according to supplementary note 8 or 9, wherein the image recognition apparatus is configured to correct the image by using the angle and perform the image recognition on the corrected image.

(Supplementary note 11)

The image recognition system according to any one of supplementary notes 1 to 10, wherein the image recognition apparatus comprises an image acquisition unit that acquires the image of the item arranged in a recognition region, and an image recognition unit that identifies the item based on external appearance of the item and a position of the item in the recognition region in the acquired image.

(Supplementary note 12)

The image recognition system according to supplementary note 11, wherein the recognition region is partitioned into at least two regions, and wherein the image recognition unit identifies the item by using different processes for the at least two regions, respectively.

(Supplementary note 13)

The image recognition system according to supplementary note 12, wherein the at least two regions are represented by any of a symbol or color expressed on the recognition region, a light projected on the recognition region, and a structure provided on the recognition region.

(Supplementary note 14)

The image recognition system according to any one of supplementary notes 11 to 13, wherein the image acquisition unit acquires the image of the item supported by the support structure provided in the recognition region, and wherein the image recognition unit identifies the item based on external appearance of the item and a position of the item on the support structure in the acquired image.

(Supplementary note 15)

The image recognition system according to any one of supplementary notes 11 to 14, wherein the image recognition unit determines a size of the item based on the position of the item in the recognition region and identifies the item by using the size.

(Supplementary note 16)

The image recognition system according to any one of supplementary notes 11 to 15, wherein when identifying the item, the image recognition unit determines a type of the item based on the position of the item in the recognition region and identifies the item by using the type.

(Supplementary note 17)

The image recognition system according to any one of supplementary notes 11 to 16, wherein when identifying the item, the image recognition unit determines brightness of the position of the item in the recognition region in the acquired image based on the position of the item in the recognition region and identifies the item by using the brightness.

(Supplementary note 18)

An image recognition method comprising steps of: acquiring an image of an item arranged in a recognition region; and identifying the item based on external appearance of the item and a position of the item in the recognition region in the acquired image.

(Supplementary note 19)

A storage medium storing a program that causes a computer to perform steps of:

acquiring an image of an item arranged in a recognition region; and identifying the item based on external appearance of the item and a position of the item in the recognition region in the acquired image.

(Supplementary note 20)

The image recognition system according to any one of supplementary notes 1 to 17, wherein the image recognition apparatus comprises an image acquisition unit that acquires the image of the item arranged such that a predetermined face is located on a reference coordinate, an extraction unit that extracts an item corresponding to the item in the acquired image based on external appearance of the item in the acquired image, and a determination unit that superimposes an outer edge of the extracted item on the item in the acquired image, calculates a difference between the outer edge and the reference coordinate, and determines the item in the acquired image based on the difference.

(Supplementary note 21)

The image recognition system according to supplementary note 20, wherein when the difference is within a predetermined range, the determination unit determines the extracted item as the item in the acquired image.

(Supplementary note 22) The image recognition system according to supplementary note 20 or 21, wherein the determination unit superimposes the outer edge on the item in the acquired image such that the center of the item in the acquired image matches the center of the outer edge.

(Supplementary note 23)

The image recognition system according to any one of supplementary notes 20 to 22, wherein the outer edge defines a rectangular region surrounding the extracted item.

(Supplementary note 24)

The image recognition system according to any one of supplementary notes 20 to 23, wherein the item is supported by the support structure having a support face configured to support the predetermined face of the item, and wherein the reference coordinate corresponds to the support face.

(Supplementary note 25)

The image recognition system according to any one of supplementary notes 20 to 23, wherein the item is placed on the placement stage extending in a horizontal direction, and wherein the reference coordinate is represented on the placement stage.

(Supplementary note 26)

The image recognition system according to any one of supplementary notes 20 to 23, wherein the item is arranged on a shelf having a shelf plate extending in a horizontal direction, and wherein the reference coordinate corresponds to a top face of the shelf plate.

(Supplementary note 27)

An image recognition method comprising steps of:

acquiring an image of an item arranged such that a predetermined face is located on a reference coordinate;

extracting an item corresponding to the item in the acquired image based on external appearance of the item in the acquired image;

superimposing an outer edge of the extracted item on the item in the acquired image;

calculating a difference between the outer edge and the reference coordinate; and determining the item in the acquired image based on the difference.

(Supplementary note 28)

A storage medium storing a program that causes a computer to perform steps of:

acquiring an image of an item arranged such that a predetermined face is located on a reference coordinate;

extracting an item corresponding to the item in the acquired image based on external appearance of the item in the acquired image;

superimposing an outer edge of the extracted item on the item in the acquired image;

calculating a difference between the outer edge and the reference coordinate; and determining the item in the acquired image based on the difference.

As described above, while the present invention has been described with reference to the example embodiments, the present invention is not limited to the example embodiments described above. Various modifications that can be understood by those skilled in the art can be made to the feature or the details of the present invention within the scope of the present invention.

This application is based upon and claims the benefit of priority from Japanese Patent Application No. 2017-024890, filed on Feb. 14, 2017, Japanese Patent Application No. 2017-024891, filed on Feb. 14, 2017, and Japanese Patent Application No. 2017-024892, filed on Feb. 14, 2017, the disclosure of which are incorporated herein in their entirety by reference.

REFERENCE SIGNS LIST 10, 20 image recognition system
11 image capture device
12 projection device
13 display device
14 placement stage
100, 300 POS terminal (image recognition apparatus)
101 CPU
102 memory
103 storage device
104 interface
110 image acquisition unit
120 image recognition unit
130 item information acquisition unit
140 display control unit 160 size determination unit
200 support portion
211 side face support face
221 bottom face support face
A recognition region
P1, P2 outer edge
Q reference line

The invention claimed is:

1. An image recognition system comprising:
   a placement stage used for placing an item below an image capture device provided so as to perform capturing of a downward direction;
   a support structure configured to support the item at a predetermined angle relative to a top face of the placement stage, the support structure comprising at least two first surfaces inclined with respect to the top face to support the item and at least two second surfaces perpendicular to the at least two first surfaces; and
   an image recognition apparatus comprising:
   at least one memory configured to store instructions; and
   at least one processor configured to execute the instructions to identify the item by performing image recognition on an image of the item acquired by the image capture device.

2. The image recognition system according to claim 1, wherein the processor is further configured to perform the image recognition that is different for the item directly placed on the placement stage and for the item supported by the support structure.

3. The image recognition system according to claim 1,
   wherein the processor is further configured to perform the image recognition on a predetermined recognition region on the placement stage, and
   wherein the support structure is provided in contact with an end of the recognition region or near the end of the recognition region.

4. The image recognition system according to claim 3, wherein the support structure is provided at a position closer to the end of the recognition region than to a midpoint of a line between a point at which an optical axis of the image capture device intersects the recognition region and the end of the recognition region.

5. The image recognition system according to claim 3 further comprising a projection device that projects the recognition region.

6. An image recognition system comprising:
   a placement stage used for placing an item below an image capture device provided so as to perform capturing of a downward direction;
   a support structure configured to support the item at a predetermined angle relative to a top face of the placement stage, the support structure having a surface inclined with respect to the top face to support the item; and
   an image recognition apparatus comprising:
   at least one memory configured to store instructions; and
   at least one processor configured to execute the instructions to identify the item by performing image recognition on an image of the item acquired by the image capture device,
   wherein the support structure has a side face support face forming the angle relative to a top face of the placement stage, and
   wherein the support structure has a bottom face support face perpendicular to the side face support face.

7. The image recognition system according to claim 1, wherein the angle is greater than 0 degree and less than 90 degrees.

8. The image recognition system according to claim 7, wherein the angle is greater than or equal to 30 degrees and less than or equal to 60 degrees.

9. The image recognition system according to claim 7, wherein the processor is further configured to correct the image by using the angle and perform the image recognition on the corrected image.

10. The image recognition system according to claim 1, wherein the processor is further configured to:
    acquire the image of the item arranged in a recognition region; and
    identify the item based on external appearance of the item and a position of the item in the recognition region in the acquired image.

11. The image recognition system according to claim 10,
    wherein the recognition region is partitioned into at least two regions, and
    wherein the processor is further configured to identify the item by using different processes for the at least two regions, respectively.

12. The image recognition system according to claim 11, wherein the at least two regions are represented by any of a symbol or color expressed on the recognition region, a light projected on the recognition region, and a structure provided on the recognition region.

13. The image recognition system according to claim 10,
    wherein the processor is further configured to:
    acquire the image of the item supported by the support structure provided in the recognition region; and
    identify the item based on external appearance of the item and a position of the item on the support structure in the acquired image.

14. The image recognition system according to claim 10, wherein the processor is further configured to determine a size of the item based on the position of the item in the recognition region and identifies the item by using the size.

15. The image recognition system according to claim 10, wherein the processor is further configured to, when identifying the item, determine a type of the item based on the position of the item in the recognition region and identifies the item by using the type.

16. The image recognition system according to claim 10, wherein the processor is further configured to, when identifying the item, determine brightness of the position of the item in the recognition region in the acquired image based on the position of the item in the recognition region and identifies the item by using the brightness.

17. An image recognition method comprising steps of:
    acquiring an image of an item arranged in a recognition region; and
    identifying the item in the acquired image,
    wherein the identifying the item comprises determining brightness of a position of the item in the recognition region in the acquired image based on the position of the item and identifying the item by using an image recognition that is different based on the brightness.

18. A non-transitory storage medium storing a program that causes a computer to perform steps of:
    acquiring an image of an item arranged in a recognition region; and
    identifying the item in the acquired image,
    wherein the identifying the item comprises determining brightness of a position of the item in the recognition region in the acquired image based on the position of the item and identifying the item by using an image recognition that is different based on the brightness.

19. The image recognition system according to claim 1, wherein the processor is further configured to:
acquire the image of the item arranged such that a predetermined face is located on a reference coordinate;
extract an item corresponding to the item in the acquired image based on external appearance of the item in the acquired image, and;
superimpose an outer edge of the extracted item on the item in the acquired image;
calculate a difference between the outer edge and the reference coordinate; and
determine the item in the acquired image based on the difference.

20. The image recognition system according to claim 19, wherein the processor is further configured to, when the difference is within a predetermined range, determine the extracted item as the item in the acquired image.

21. The image recognition system according to claim 19, wherein the processor is further configured to superimpose the outer edge on the item in the acquired image such that the center of the item in the acquired image matches the center of the outer edge.

22. The image recognition system according to claim 19, wherein the outer edge defines a rectangular region surrounding the extracted item.

23. The image recognition system according to claim 19, wherein the item is supported by the support structure having a support face configured to support the predetermined face of the item, and
wherein the reference coordinate corresponds to the support face.

24. The image recognition system according to claim 19, wherein the item is placed on the placement stage extending in a horizontal direction, and
wherein the reference coordinate is represented on the placement stage.

25. The image recognition system according to claim 19, wherein the item is arranged on a shelf having a shelf plate extending in a horizontal direction, and
wherein the reference coordinate corresponds to a top face of the shelf plate.

26. An image recognition method comprising steps of:
acquiring an image of an item arranged such that a predetermined face is located on a reference coordinate;
extracting an item corresponding to the item in the acquired image based on external appearance of the item in the acquired image;
superimposing an outer edge of the extracted item on the item in the acquired image;
calculating, as a difference, a distance between the outer edge and the reference coordinate; and
determining the item in the acquired image by adopting the extracted item when the difference is within a predetermined range and discarding the extracted item when the difference is not within the predetermined range.

27. A non-transitory storage medium storing a program that causes a computer to perform steps of:
acquiring an image of an item arranged such that a predetermined face is located on a reference coordinate;
extracting an item corresponding to the item in the acquired image based on external appearance of the item in the acquired image;
superimposing an outer edge of the extracted item on the item in the acquired image;
calculating, as a difference, a distance between the outer edge and the reference coordinate; and
determining the item in the acquired image by adopting the extracted item when the difference is within a predetermined range and discarding the extracted item when the difference is not within the predetermined range.

* * * * *